United States Patent
Jain et al.

(10) Patent No.: US 11,405,971 B2
(45) Date of Patent: Aug. 2, 2022

(54) LOCATION ASSISTED DYNAMIC MODE PREFERENCE BETWEEN 5G AND 4G

(71) Applicant: QUALCOMM Incorporated, San Diego, CA (US)

(72) Inventors: Amit Jain, San Diego, CA (US); Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 16/802,535

(22) Filed: Feb. 26, 2020

(65) Prior Publication Data

US 2021/0267000 A1    Aug. 26, 2021

(51) Int. Cl.

| H04L 5/00 | (2006.01) |
|---|---|
| H04W 48/16 | (2009.01) |
| H04W 76/16 | (2018.01) |
| H04B 7/0413 | (2017.01) |
| H04W 8/24 | (2009.01) |
| H04W 24/08 | (2009.01) |
| H04W 72/10 | (2009.01) |

(52) U.S. Cl.
CPC ......... *H04W 76/16* (2018.02); *H04B 7/0413* (2013.01); *H04W 8/245* (2013.01); *H04W 24/08* (2013.01); *H04W 72/10* (2013.01)

(58) Field of Classification Search
None
See application file for complete search history.

(56) References Cited

U.S. PATENT DOCUMENTS

| 8,238,980 | B1 * | 8/2012 | Shusterman | ...... H04W 52/0251 |
|---|---|---|---|---|
| | | | | 455/435.2 |
| 10,536,955 | B2 * | 1/2020 | Gholmieh | ......... H04W 72/0486 |
| 10,681,562 | B1 * | 6/2020 | Ertimo | .................. H04W 16/18 |
| 11,240,729 | B1 * | 2/2022 | Xu | ......................... H04L 45/123 |
| 11,304,209 | B2 * | 4/2022 | Nammi | ................. H04W 72/10 |

(Continued)

FOREIGN PATENT DOCUMENTS

WO    WO-2019088364 A1    5/2019

OTHER PUBLICATIONS

International Search Report and Written Opinion—PCT/US2021/012978—ISA/EPO—dated May 18, 2021.

*Primary Examiner* — Sithu Ko
(74) *Attorney, Agent, or Firm* — Thien T. Nguyen

(57) ABSTRACT

A user equipment (UE) is configured to be connected to multiple wireless networks, including e.g., a 5G New Radio (NR) network and an Evolved Universal Mobile Telecommunications System (UMTS) Terrestrial Radio Access Network (E-UTRAN). The UE may assign one of the networks with a higher priority for connection. The UE monitors wireless signal metrics to determine if the priority assignment of the networks should be inverted. The UE may monitor the expected data throughput, e.g., determined based on the availability of carrier aggregation, the carrier aggregation order, the multiple in multiple out (MIMO) order, the available bandwidth, E-UTRAN NR—Dual connectivity (ENDC) availability, or quality metrics of wireless signals from one or both wireless networks. The UE may further dynamically select a carrier subscription as the Default Data Subscription (DDS) based on the metrics as well as whether a wireless network associated with a carrier subscription supports ENDC.

28 Claims, 10 Drawing Sheets

(56) References Cited

U.S. PATENT DOCUMENTS

| | | | |
|---|---|---|---|
| 2016/0135213 A1* | 5/2016 | Zhu .................. | H04W 72/1284 |
| | | | 370/329 |
| 2017/0094629 A1* | 3/2017 | Osterwise ............ | H04W 60/04 |
| 2017/0318523 A1* | 11/2017 | Lindoff ................ | H04W 48/06 |
| 2017/0374607 A1* | 12/2017 | Wu ....................... | H04W 88/10 |
| 2018/0027460 A1* | 1/2018 | Zhang .................. | H04W 48/20 |
| | | | 455/437 |
| 2018/0343697 A1* | 11/2018 | Hsu ....................... | H04W 76/16 |
| 2019/0014542 A1* | 1/2019 | Jain ..................... | H04W 52/028 |
| 2019/0045517 A1* | 2/2019 | Logan ............... | H04W 72/0446 |
| 2019/0069205 A1* | 2/2019 | Lee ....................... | H04W 48/20 |
| 2019/0069226 A1* | 2/2019 | Lee ....................... | H04W 48/18 |
| 2019/0223091 A1 | 7/2019 | Huang-Fu et al. | |
| 2019/0335384 A1* | 10/2019 | Zhao .................... | H04W 8/005 |
| 2019/0357199 A1 | 11/2019 | Ali et al. | |
| 2020/0008196 A1* | 1/2020 | Low .................. | H04W 72/0453 |
| 2020/0053642 A1* | 2/2020 | Huang-Fu ............. | H04W 76/22 |
| 2020/0280901 A1 | 9/2020 | Na | |
| 2020/0367201 A1* | 11/2020 | Cai ....................... | H04W 48/16 |
| 2021/0227376 A1* | 7/2021 | Jha ....................... | H04W 60/04 |

\* cited by examiner

LOCATION ASSISTED DYNAMIC MODE PREFERENCE BETWEEN 5G AND 4G

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a positioning engine, e.g., a location server, or a UE may determine a position or location of a supported UE using, e.g., positioning measurements derived from base stations in the wireless network to which the UE is connected. The information may be associated with UE based positioning techniques or UE-assisted positioning techniques. These methods may support various location services (for example, navigation systems, emergency communications), and supplement one or more additional location systems supported by wireless communications devices (such as global positioning system (GPS) technology).

SUMMARY

A user equipment (UE) is configured to be connected to multiple wireless networks, including a first and second wireless networks, which may be a 5G New Radio (NR) network and an Evolved Universal Mobile Telecommunications System (UMTS) Terrestrial Radio Access Network (E-UTRAN). The UE may assign one of the networks with a higher priority for connection. The UE monitors wireless signal metrics to determine if the priority assignment of the networks should be inverted. The UE may monitor the expected data throughput, e.g., determined based on the availability of carrier aggregation, the carrier aggregation order, the multiple in multiple out (MIMO) order, the available bandwidth, E-UTRAN NR—Dual connectivity (ENDC) availability, or quality metrics of wireless signals from one or both wireless networks. The UE may further dynamically select a carrier subscription as the Default Data Subscription (DDS) based on the metrics as well as whether a wireless network associated with a carrier subscription supports ENDC.

In one implementation, a method for wireless communication of a user equipment (UE) performed by the UE, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes receiving wireless signals from one or more base stations in the first wireless network; determining an expected data throughput for at least the first wireless network based on the received wireless signals; and assigning the higher priority for connection to the second wireless network than the first wireless network at least partially due to the determined expected data throughput for at least the first wireless network.

In one implementation, a user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes a wireless transceiver configured to wirelessly communicate with network entities in a wireless communication system; at least one memory; at least one processor coupled to the wireless transceiver and the at least one memory, wherein the at least one processor is configured to: receive wireless signals, via the wireless transceiver, from one or more base stations in the first wireless network; determine an expected data throughput for at least the first wireless network; and assign the higher priority for connection to the second wireless network than the first wireless network at least partially due to the determined expected data throughput for at least the first wireless network.

In one implementation, a user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes means for receiving wireless signals from one or more base stations in the first wireless network; means for determining an expected data throughput for at least the first wireless network; and means for assigning the higher priority for connection to the second wireless network than the first wireless network at least partially due to the determined expected data throughput for at least the first wireless network.

In one implementation, a non-transitory storage medium including program code stored thereon, the program code is operable to cause at least one processor in a user equipment (UE) configured for wireless communication, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes program code to receive wireless signals from one or more base stations in the first wireless network; program code to determine an expected data throughput for at least the first wireless network; and program code to assign the higher priority for connection to the second wireless network than the first wireless network at least partially due to the determined expected data throughput for at least the first wireless network.

In one implementation, a method for wireless communication of a user equipment (UE) performed by the UE, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes transmitting location information for a location of the UE to a server; receiving signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof; and assigning the higher priority for connection to the second wireless network than the first wireless network by the UE at least partially due to the signal information associated with the location received from the server.

In one implementation, a user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes a wireless transceiver configured to wirelessly communicate with network entities in a wireless communication system; at least one memory; at least one processor coupled to the wireless transceiver and the at least one memory, wherein the at least one processor is configured to: transmit, via the wireless transceiver, location information for a location of the UE to a server; receive, via the wireless transceiver, signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof; and assign the higher priority for connection to the second wireless network than the first wireless network by the UE at least partially due to the signal information associated with the location received from the server.

In one implementation, a user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes a means for transmitting location information for a location of the UE to a server; a means for receiving signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof; and a means for assigning the higher priority for connection to the second wireless network than the first wireless network by the UE at least partially due to the signal information associated with the location received from the server.

In one implementation, a non-transitory storage medium including program code stored thereon, the program code is operable to cause at least one processor in a user equipment (UE) configured for wireless communication, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes program code to transmit location information for a location of the UE to a server; program code to receive signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof; and program code to assign the higher priority for connection to the second wireless network than the first wireless network by the UE at least partially due to the signal information associated with the location received from the server.

In one implementation, a method for wireless communication of a user equipment (UE) performed by a server, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes receiving signal information from the UE and attached location information for a location of the UE, the signal information comprising one or more of an expected data throughput for at least the first wireless network determined by the UE at the location for wireless signals from one or more base stations in the first wireless network, an assignment of higher priority for connection to the second wireless network than the first wireless network by the UE at least partially due to the expected data throughput for at least the first wireless network, or a combination thereof; storing the received signal information and attached location information for the location; and transmitting at least the received signal information to a second UE when the second UE is at the location.

In one implementation, a server configured for wireless communications with a user equipment (UE) performed by a server, wherein the UE supports a first wireless network comprising a Fifth Generation (5G) New Radio (NR) network and a second wireless network comprising an Evolved Universal Mobile Telecommunications System (UMTS)

Terrestrial Radio Access Network (E-UTRAN), wherein by default the UE assigns a higher priority for connection to the first wireless network than the second wireless network, includes an external interface configured to wirelessly communicate with UEs in a wireless communication system; at least one memory; at least one processor coupled to the external interface and the at least one memory, wherein the at least one processor is configured to: receive, via the external interface, signal information from the UE and attached location information for a location of the UE, the signal information comprising one or more of an expected data throughput for at least the first wireless network determined by the UE at the location for wireless signals from one or more base stations in the first wireless network, an assignment of higher priority for connection to the second wireless network than the first wireless network by the UE at least partially due to the expected data throughput for at least the first wireless network, or a combination thereof; store the received signal information and attached location information for the location; and transmit, via the external interface, at least the received signal information to a second UE when the second UE is at the location.

In one implementation, a server configured for wireless communications with a user equipment (UE) performed by a server, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes means for receiving signal information from the UE and attached location information for a location of the UE, the signal information comprising one or more of an expected data throughput for at least the first wireless network values of one or more quality metrics measured determined by the UE at the location for wireless signals from one or more base stations in the first wireless network, an assignment of higher priority for connection to the second wireless network than the first wireless network by the UE at least partially due to the expected data throughput for at least the first wireless network values of the one or more quality metrics being less than associated predetermined thresholds, or a combination thereof; means for storing the received signal information and attached location information for the location; and means for transmitting at least the received signal information to a second UE when the second UE is at the location In one implementation, a non-transitory storage medium including program code stored thereon, the program code is operable to cause at least one processor in a server configured to support a user equipment (UE), wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, includes program code to receive signal information from the UE and attached location information for a location of the UE, the signal information comprising one or more of an expected data throughput for at least the first wireless network values of one or more quality metrics measured determined by the UE at the location for wireless signals from one or more base stations in the first wireless network, an assignment of higher priority for connection to the second wireless network than the first wireless network by the UE at least partially due to the expected data throughput for at least the first wireless network values of the one or more quality metrics being less than associated predetermined thresholds, or a combination thereof; program code to store the received signal information and attached location information for the location; and program code to transmit at least the received signal information to a second UE when the second UE is at the location.

In one implementation, a method for wireless communication of a user equipment (UE) performed by the UE, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), the method includes monitoring an upper layer indication information element (IE) from a first base station from the first wireless network while in idle mode and the upper layer indication information element (IE) from a second base station from the second wireless network while in idle mode; determining which of the first wireless network and the second wireless network supports ENDC mode from the upper layer indication IE from the first base station from the first wireless network and the upper layer indication information element (IE) from the second base station from the second wireless network; and dynamically selecting the first carrier subscription or the second carrier subscription for DDS based which wireless network supports the ENDC mode.

In one implementation, a user equipment (UE) configured for wireless communications, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), includes a wireless transceiver configured to wirelessly communicate with network entities in a wireless communication system; at least one memory; at least one processor coupled to the wireless transceiver and the at least one memory, wherein the at least one processor is configured to: monitor an upper layer indication information element (IE) received from a first base station from the first wireless network while in idle mode, received via the wireless transceiver, and the upper layer indication information element (IE) from a second base station from the second wireless network while in idle mode, received via the wireless transceiver; determine which of the first wireless network and the second wireless network supports ENDC mode from the upper layer indication IE from the first base station from the first wireless network and the upper layer indication information element (IE) from the second base station from the second wireless network; and dynamically select the first carrier subscription or the second carrier subscription for DDS based which wireless network supports the ENDC mode.

In one implementation, a user equipment (UE) configured for wireless communications, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), includes means for monitoring an upper layer indication information element (IE) from a first base station from the first wireless network while in idle mode and the upper layer indication information element (IE) from a second base station from the second wireless network while in idle mode; means for determining which of the first wireless network and the second wireless network supports ENDC mode from the upper layer indication IE from the first base station from the first wireless network and the upper layer indication information element (IE) from the second base station from the second wireless network; and means for dynamically selecting the first carrier subscription or the second carrier subscription for DDS based which wireless network supports the ENDC mode.

In one implementation, a non-transitory storage medium including program code stored thereon, the program code is operable to cause at least one processor in a user equipment (UE) configured for wireless communication, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), includes program code to monitoring an upper layer indication information element (IE) from a first base station from the first wireless network while in idle mode and the upper layer indication information element (IE) from a second base station from the second wireless network while in idle mode; program code to determining which of the first wireless network and the second wireless network supports ENDC mode from the upper layer indication IE from the first base station from the first wireless network and the upper layer indication information element (IE) from the second base station from the second wireless network; and program code to dynamically selecting the first carrier subscription or the second carrier subscription for DDS based which wireless network supports the ENDC mode.

Figure 1:
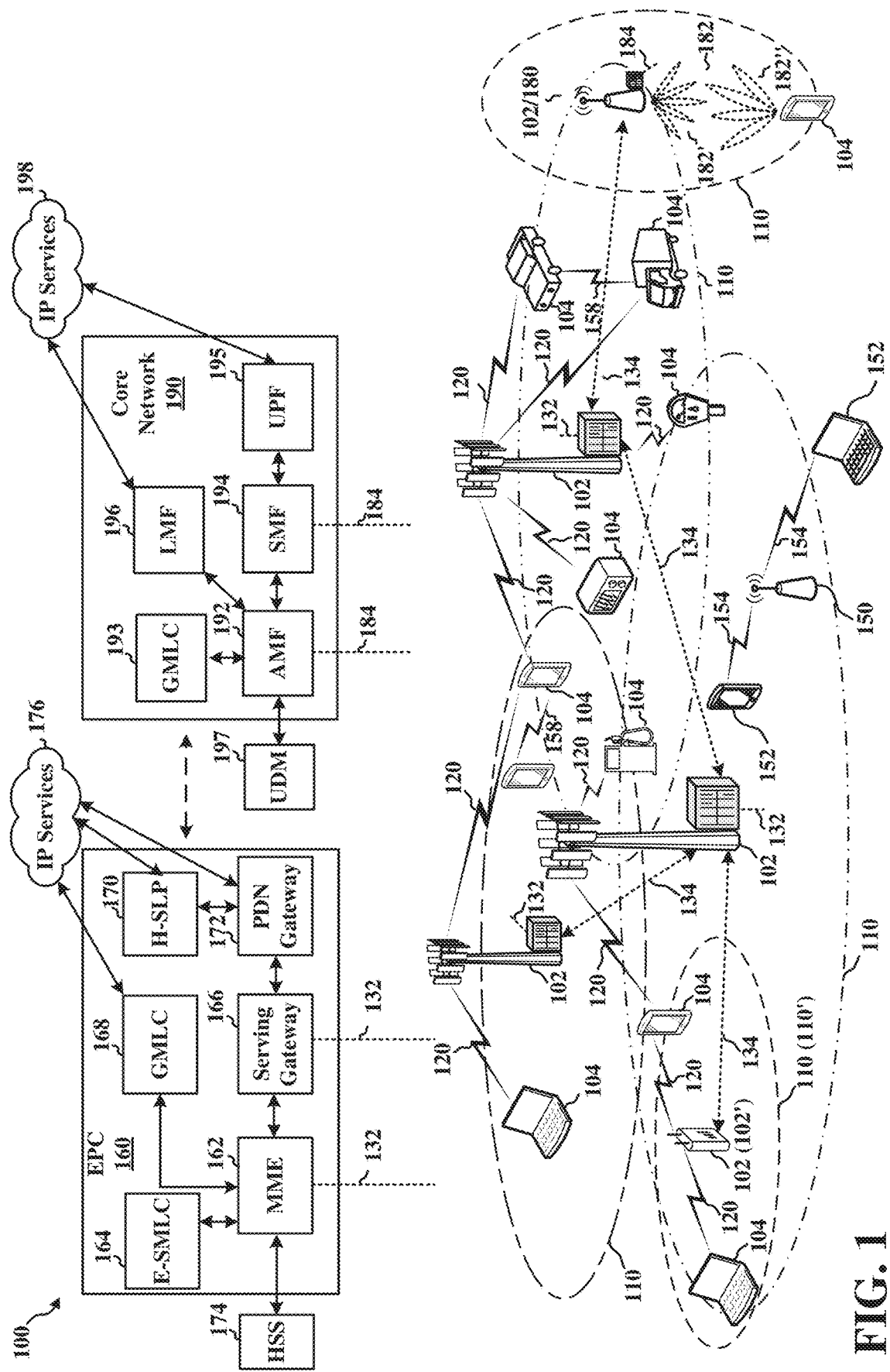
FIG. 1 shows a diagram illustrating an example of a wireless communications system including multiple separate wireless networks.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102a, 102b. When referring to such an element using only the first number, any instance of the element is to be understood (e.g. element 102 in the previous example may refer to elements 102a and 102b.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G) operating in mmWave bands) network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

To meet the growing demands for expanded connectivity, wireless communication technologies or RATs are advancing from the LTE technology, sometimes referred to as 4G, to a next generation NR technology, sometimes referred to as 5G. For example, NR may provide lower latency and a higher bandwidth or throughput then LTE. As 5G NR is gaining commercial traction in key markets, deployment of 5G NR is being looked in both re-farmed and new NR frequency bands.

As 5G NR continues to gain traction and is in the process of being deployed, many UEs will be multi-mode devices supporting LTE and other legacy technologies along with 5G NR. For example, UEs may support multi-subscriber identity module (SIM) along with 5G NR, where 5G NR will be supported on the Default Data Subscription (DDS).

As 5G NR is expected to provide higher bandwidth or throughput then LTE, 5G NR is conventionally assigned a higher priority, or mode preference, than LTE in multi-mode UEs for communication. For example, with a priority or mode preference of 5G/4G/3G, a UE will always attempt to connect to 5G before connecting to 4G if no 5G connectivity is available at that location. Due to a higher priority of 5G NR, the UE will connect to the 5G NR network before the LTE network. However, 5G NR coverage may be sparse during the initial few years of deployment, and consequently, the current implementation of preferring NR over LTE may result in serious performance issues. Moreover, while LTE offers good support for carrier aggregation, there is currently little or no support for carrier aggregation in 5G NR.

Thus, the conventional implementation of assigning higher priority to 5G NR than LTE may result in poor performance. For example, UE performance may suffer where 5G NR coverage is sparse and the UE is in mobility condition. UE performance may also suffer where a 4G current serving cell is strong with strong neighbor cells on frequency bands with which the supports carrier aggregation, while 5G NR does not support carrier aggregation or supports carrier but the companion frequency band is week.

FIG. 1 shows a diagram illustrating an example of a wireless communications system 100 including multiple separate wireless networks. The wireless communications system (also referred to as a wireless wide area network (WWAN)) includes base stations 102, UEs 104, an Evolved Packet Core (EPC) 160, and a 5G Core (5GC) network 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 within a same wireless network may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. The E-SMLC 164 may support location of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients, e.g., within IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an Access and Mobility Management Function (AMF) 192, a Gateway Mobile Location Center (GMLC) 193, a Session Management Function (SMF) 194, and a User Plane Function (UPF) 195, and a Location Management Function (LMF) 196. The AMF 192 may be in communication with a Unified Data Management (UDM) 197. The AMF 192 is the control node that processes the signaling between the UEs 104 and the 5GC 190 and which, for positioning functionality, may communicate with the LMF 196. The GMLC 193 may be used to allow an external client, within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The IP Services 198 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 104 may enter a connected state with a wireless communication network that may include a base station 102 for position determination. In one example, the UE 104 may communicate with a cellular communication network by transmitting wireless signals to, or receiving wireless signals from a cellular base station. In another example, the UE 104 may communicate with a base station for a local area network (LAN), such as a Wi-Fi access point or other wireless network.

In particular implementations, the UE 104 may have circuitry and processing resources capable of obtaining location related measurements. Location related measurements obtained by UE 104 may include measurements of signals received from satellite vehicles belonging to a Satellite Positioning System (SPS) or Global Navigation Satellite System (GNSS) such as GPS, GLONASS, Galileo or Beidou and/or may include measurements of signals received from terrestrial base stations fixed at known locations (e.g., such as base stations 102 in FIG. 1). The UE 104 or location server (e.g., E-SMLC 165, H-SLP 170, or LMF 196), to which UE 104 may send the measurements, may then obtain a location estimate for the UE 104 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, Angle of Departure (AOD), Angle of Arrival (AOA), multi-cell Round Trip signal propagation Time (multi-RTT), or Enhanced Cell ID (ECID) or combinations thereof. In some of these techniques (e.g. A-GNSS, AFLT and OTDOA), pseudoranges or timing differences may be measured at UE 104 relative to three or more terrestrial base stations 102 fixed at known locations based at least in part, on pilots, positioning reference signals (PRS) or other positioning related signals transmitted by the base stations 102 and received at the UE 104.

In some examples, the base stations 102 may transmit downlink positioning, such as PRS or Tracking Reference Signals. The positioning signal transmissions may be configured for a specific UE 104 to measure one or more parameters and use as part of UE based positioning technique or to report as part of a UE-assisted positioning technique. Similarly, the UE 104 may transmit positioning signal, such as uplink PRS or Sounding Reference Signals, and base stations 102 may measure one or more parameters to be used as part of UE based positioning technique or as part of a UE-assisted positioning technique. The PRS transmission and report parameter feedback may support various location services (for example, navigation systems, and emergency communications). In some examples, the report parameters supplement one or more additional location systems supported by the UE 104 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

Aspects of wireless communications system 100 may include use of PRS transmissions by the base station 102 or sounding reference signal (SRS) transmissions by the UE 104 for UE location determination. For downlink-based UE location determination, a location server, e.g., a Location Management Function (LMF) in a NR network or a Secure User Plane Location (SUPL) Location Platform (SLP) in LTE, may be used to provide positioning assistance, such as PRS assistance data (AD) to the UE 104. In UE-assisted positioning, the location server may receive measurement reports from the UE 104 that indicates position measurements for one or multiple base stations 102 with which the location server may determine a position estimate for the UE 104, e.g., using OTDOA, or other desired techniques.

While a UE 104 may be in a location that includes coverage from multiple wireless networks, e.g., as illustrated in FIG. 1, a UE 104 conventionally derives its location and position using information obtained from only one terrestrial based wireless network. 5G NR is beginning to be deployed, but is not yet everywhere, and accordingly, UEs 104 are configured to support multiple networks, e.g., support LTE or other legacy technologies along with 5G NR. For example, UEs 104 may support multi-SIM (MSIM), non-standalone (NSA), E-UTRAN New Radio—Dual connectivity (ENDC), etc.

Figure 2:
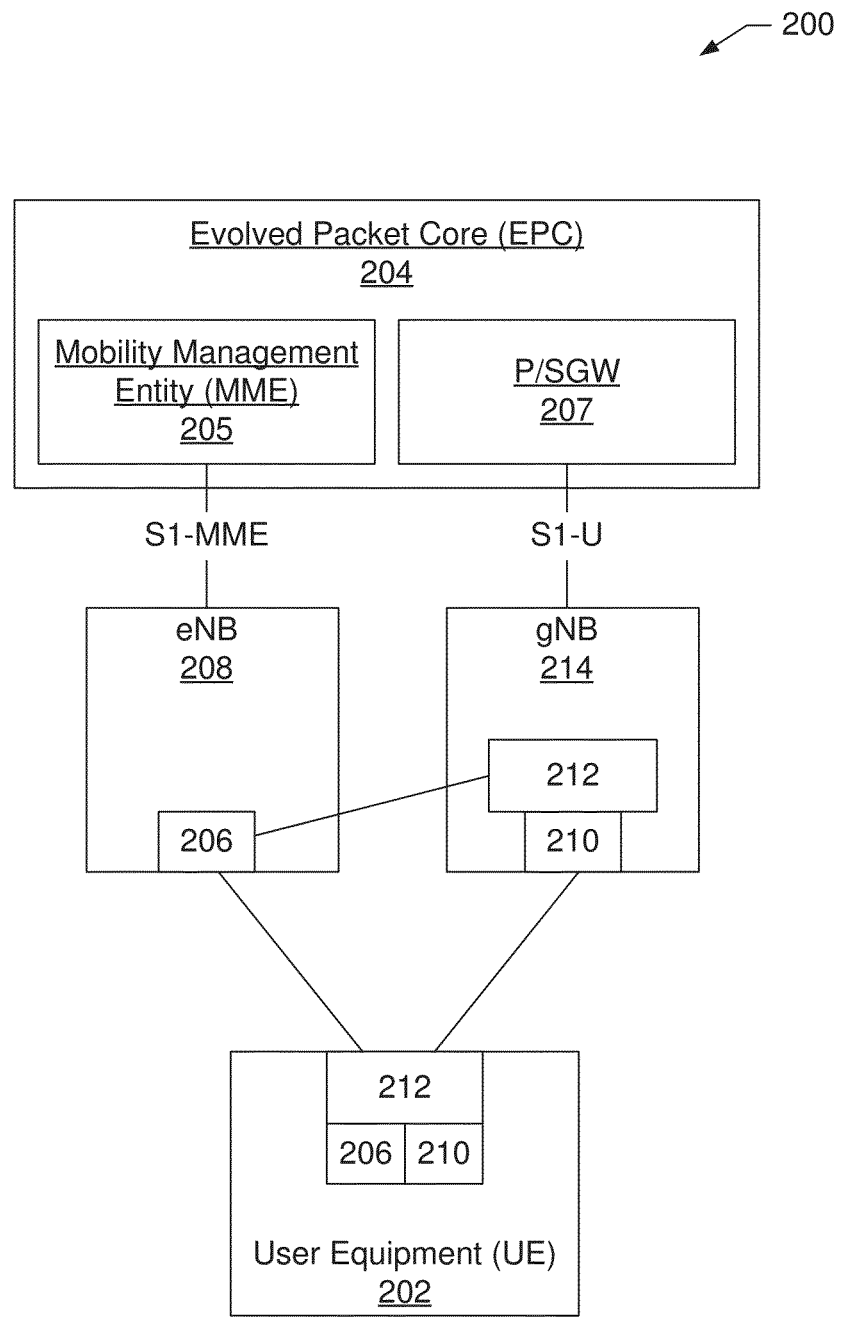
FIG. 2 illustrates a network system capable of E-UTRAN NR—Dual connectivity (ENDC), according to embodiments of the present disclosure.

FIG. 2, by way of example, illustrates a network system 200 capable of E-UTRAN New Radio—Dual connectivity (ENDC), according to embodiments of the present disclosure. The network system 200 is capable of E-UTRAN (LTE) and NR (5G) multi-connectivity, sometimes referred to as Non-Standalone Architecture (NSA), as opposed to a standalone architecture (SA) that requires a 5G core network to be in place. The system 200 may correspond to a portion of the wireless communications system 100 and include an LTE-NR tight interworking architecture with dual connectivity. The NR network may be unstable because it does not have ubiquitous coverage and has small cell radius. To overcome this problem, it may be desirable for a UE 115 to connect to both the LTE network and the NR network. In an embodiment, the NR network may be overlaid over the LTE network. The UE 202 supports dual connectivity, which allows the UE 202 to connect to both the LTE and NR network simultaneously. The UE 202 supports a non-standalone mode that utilizes the LTE network to support the connectivity of the UE 202 to the NR network. If the UE 202 is connected to the NR network, the UE 202 is also connected to the LTE network. The NR network may be a "best effort" network that is anchored in the LTE network. For example, if the UE 202 is within NR network coverage, the UE 202 will use the NR network to transmit data. In this example, the UE 202 harnesses the lower latency, greater bandwidth, and/or higher throughput offered by the NR network, while leveraging the stable links provided by the LTE network. If the connection to the NR network is not stable or is weak, the UE 202 may connect to the LTE network without connecting to the NR network. As discussed herein, however, it may be advantageous to prioritize the LTE network in ENDC as well. For example, the UE may check quality metrics on the LTE frequencies and the associated 5G NR frequencies that UE supports as a ENDC combination and may prioritize LTE over NR when the LTE serving cell satisfies a quality metric threshold and there is high likelihood of the UE being in ENDC based on the associated NR cell measurements.

The UE 202 may transmit data using an Evolved Packet Core (EPC) 204, which is the core network of the LTE system. The EPC 204 includes a Mobility Management Entity (MME) 205 and a P/SGW 207. The data traffic may be split. For example, the UE 202 may transmit LTE Radio Link Control (RLC)/Media Access Control (MAC) 206 to an eNB 208 and transmit NR RLC/MAC 210 and LTE/NR Packet Data Convergence Protocol (PDCP) 212 to the gNB 214. The eNB 208 and gNB 214 may communicate via a backhaul wireless or wireline connection. A split bearer may be located at the gNB 214, and the data sent to the eNB 208 will be merged at the gNB 214 with other data. The gNB 214 may aggregate the data and send it to the P/SGW 207 using the S1-U interface. Additionally, signaling information may pass through the eNB 208 to the MME 205 using the S1-MME interface. Although FIG. 2 illustrates an LTE-NR/EPC system, this is not intended to be limiting and other embodiments may include different systems. For example, in another embodiment, the system may include an LTE-NR/NGC system.

In some embodiments, the UE 202 may be in at most one state of a plurality of states. If the UE 202 is connected to a first network (e.g., NR network, 5G network, etc.) and a second network (e.g., LTE network, 4G network, etc.) simultaneously, the UE 202 is in a first connected mode. In this example, the UE 202 may be connected to both the NR network and the LTE network. The LTE network may be associated with an LTE cell, and the NR network may be associated with an NR cell. If the UE 202 is connected to the second network, but not the first network, the UE 202 is in a second connected mode. In this example, the UE 202 may be connected to the LTE network, but not to the NR network. If the UE 202 is idle, the UE 202 is in an idle mode connected to the second network, but not the first network. In this example, the UE 202 may be camped in the LTE network. The UE 202 may be in the idle mode if the UE 202 has no data to transmit or is not receiving data from another device.

If the UE 202 is in the second connected mode or the idle mode, however, the UE 202 may be unable to know whether the UE 202 is within coverage by the NR network or be able to receive the NR signal strength information. For example, if the UE 202 is in the idle mode, the UE 202 monitors the LTE network, not the NR network. If the UE 202 knows the frequency in which the NR network operates, the UE 202 may be able to determine whether the UE 202 is within coverage by the NR network. If the UE 202 knows the frequency, the UE 202 may tune to this frequency and transmit data.

As 5G NR is expected to provide higher bandwidth or throughput then LTE, 5G NR is conventionally assigned a higher priority than LTE in multi-mode UEs. However, 5G NR coverage may be sparse during the initial few years of deployment, and consequently, the current implementation of preferring NR over LTE may result in serious performance issues. Moreover, while LTE offers good support for carrier aggregation, there is currently little or no support for carrier aggregation in 5G NR.

Thus, there is a need for improved implementation of network selection in multi-mode devices that does not rely on, e.g., an expected performance of a network assuming a level of coverage that has not yet occurred. The UE 104, for example, may estimate an expected data throughput for the 5G NR network and/or LTE network and may adjust priority, e.g., assign a higher priority to the LTE network, accordingly. The UE 104 may additionally monitor various signal metrics for the 5G NR network and/or LTE network and adjust priority accordingly.

For example, in one implementation, the UE 104 may continuously monitor various quality metrics of signals transmitted by the 5G NR network. The values of the quality metrics may be compared to associated predetermined thresholds, and a higher priority may be assigned to LTE wireless network, for example, if the values of the quality metrics fall below the associated predetermined thresholds. For example, while in IDLE mode, the UE may cache values of Synchronization Signals (SS) Reference Signal Received Power (SS-RSRP), SS Received Signal Strength Indicator (SS-RSSI), SS Reference Signal Received Quality (SS-RSRQ). If in a connected mode, the UE 104 may continuously and periodically monitor SS-RSRP, SS-RSSI, SS-RSRQ, as well as Channel State Information (CSI)-RSRP, CSI-RSSI, and CSI-RSRQ. Additional quality metrics may be monitored by the UE 104. For example, while in the connected mode, the UE 104 may estimate the throughput from LTE and NR based on channel conditions and current/past grant patterns. If the values of the quality metrics for the 5G NR signals fall below associated thresholds, the UE may auto change the mode preference to LTE, NR, 3G, 2G from a current default preference of NR, LTE, 3G, 2G.

Additionally, based on the values of the quality metrics, the grant allocated to the UE 104 from the 5G NR network 190 may change.

The UE 104 may estimate an expected data throughput for the 5G NR network and/or LTE network based on, e.g., received signals from the 5G NR network and/or LTE network, and use the expected data throughput to adjust the priority for connection.

In one example, the expected data throughput for one or more networks may be estimated based on whether carrier aggregation is possible. For example, generally, there are a large number of carrier aggregation band combinations available on LTE networks, while carrier aggregation with 5G NR networks is limited. The use of carrier aggregation may increase data throughput and, accordingly, the availability of carrier aggregation may be used as an estimate an expected data throughput.

Accordingly, the UE may monitor the serving cell and neighbor cells, from which the UE may determine the availability of carrier aggregation mode on the 5G NR network 190 (and optionally the LTE network), which provides an indication of the expected data throughput on the network. The network priority assignment for connectivity may be adjusted accordingly. For example, a higher priority may be assigned to the LTE network 160 at least partially due to carrier aggregation mode not being available on the 5G NR network 190.

Additionally, the expected data throughput may further be estimated based on the carrier aggregation order of the LTE network 160. The carrier aggregation order, for example, is the number of cells or carriers that may be aggregated on the network. The carrier aggregation order may be estimated, for example, by searching the availability of frequencies on the supported LTE carrier aggregation band combinations. Thus, the UE 104 may determine that the carrier aggregation mode is available on the 5G NR network 190, while the LTE carrier aggregation order is low, and thus, the higher priority for connection may remain with the default priority to the 5G NR network 190. On the other hand, the UE 104 may determine that the carrier aggregation mode is not available on the 5G NR network 190, while the LTE carrier aggregation order is high, and thus, the expected data throughput for the LTE network 160 may be higher than the 5G NR network 190. In this instance, a higher priority for connection may be assigned to the LTE network 160, at least partially due to the LTE carrier aggregation order.

Additionally, the expected data throughput may further be estimated based on the multiple input, multiple output (MIMO) layers available to communicate with a serving base station. The number of MIMO layers indicates the number of transmit (Tx) and receive (Rx) antennas for signals transmitted on the same frequency. The amount of MIMO layers is related to the data throughput. The MIMO layers for a serving cell or base station may be determined by determining the rank using a reference signal from the base station. Thus, the UE 104 may determine that generate an estimate of expected data throughput on a network by determining the MIMO layers available for the network. Thus, for example, if carrier aggregation mode is not available on the 5G NR network 190, but the MIMO layers is high, e.g., compared to the LTE network, the UE 104 may estimate that the expected data throughput may be higher on the 5G NR network 190 and may keep the higher priority for connection with the default priority to the 5G NR network 190. On the other hand, if the MIMO layers for the 5G NR network is low and carrier aggregation is not available, or the MIMO layers for the 5G NR network is relatively low compared to the LTE network, the expected data throughput for the LTE network 160 may be estimated to be higher than the 5G NR network 190. In this instance, a higher priority for connection may be assigned to the LTE network 160, at least partially due to the MIMO layers.

In another example, the expected data throughput for one or more networks may be estimated based on the available maximum bandwidth supported by one or more base stations in the 5G NR network at the current location of the UE 104. For example, at some locations, the band of operation for a 5G NR base station may have a 40 MHz bandwidth, while at other locations, the band of operations may have a 100 MHz bandwidth. Generally, a larger amount of available bandwidth indicates higher expected data throughput. The UE 104 may further determine a maximum bandwidth supported by one or more base stations in the 5G NR network 190 (and optionally the LTE network 160), e.g., based on the cell capability at the location of the UE 104 as well as the frequency band of operations of the serving cell. The UE 104 may cache the bandwidth of different bandwidth parts (BWP) configured for one or more base stations in the 5G NR network 190, e.g., at a particular location, and use the cached bandwidths to estimate the total available bandwidth. The UE 104 may assign a higher priority to the LTE network 160 at least partially due to the determined maximum bandwidth support from base stations in the 5G NR network 190, for example, if the 5G NR network 190 bandwidth is limited at the current location of the UE 104.

In another example, the expected data throughput for one or more networks may be estimated based on the availability of LTE-NR ENDC mode at the current location of the UE 104. For example, if the UE 104 supports LTE-NR ENDC, the UE 104 may determine whether ENDC is available at the UE's current location, for example, by monitoring an "upper layer indication" information element (IE) that indicates availability of ENDC. The UE 104 may assign a higher priority for connection to the LTE network 160 if ENDC is available at the location. Additionally, the UE 104 may monitor quality metrics of signals from the LTE network 160 in addition to the 5G NR network 190. The UE 104 may assign a higher priority to the LTE network 160 over the 5G NR network 190, e.g., when the serving cell in the LTE network 160 satisfies a predetermined quality metric threshold. Further, in assigning a higher priority to the LTE network 160, the UE 104 may consider whether there is a high likelihood of the UE 104 being in ENDC based on the associated NR cell measurements.

In some implementations, the UE 104 may crowdsource the collected information tagged with the location of the UE 104 to a server. For example, the UE may attach location information for its current location to signal information, such as the expected data throughput, e.g., determined based on the availability of carrier aggregation in the 5G NR network 190 (and optionally the LTE network 160), the carrier aggregation order, the MIMO order, the available bandwidth, ENDC availability, and/or values of the one or more quality metrics, the priority assignment used, etc., or a combination thereof, and may upload the signal information and attached location information to a server. The information may be downloaded later and used by any new devices at the same location.

In current implementations of devices that support multiple carrier subscriptions, e.g., MSIM, including 5G NR, the 5G NR subscription is the Default Data Subscription (DDS), based on the assumption that a 5G NR network will always outperform an LTE network in data rates. This assumption, however, is not correct in multiple cases. For example, the deployment of the 5G NR network may be sparse and, consequently, the channel conditions on the 5G NR network may be significantly inferior than an LTE network resulting into lower Channel Quality Indicator (CQI), Signal to Noise Ratio (SNR), and lower grant from the 5G NR network. Additionally, the 5G NR network at particular locations may be deployed on re-farmed frequency bands where the Sub-carrier Spacing (SCS) and maximum bandwidth is comparable to the LTE network. Further, 5G NR carrier aggregation may not be available in a particular location, particularly as carrier aggregation on 5G NR may not be available for years until deployments are more dense. Additionally, there is a greater likelihood of ENDC availability over 5G NR carrier aggregation.

Thus, in some implementations, the UE 104 may support multiple carrier subscriptions, e.g., MSIM, including the LTE network 160 and the 5G NR network 190, and the UE and may dynamically select the subscription for the LTE network 160 or the subscription for the 5G NR network 190 for the Default Data Subscription (DDS), e.g., at least partially based on the expected data throughput, e.g., determined based on the availability of carrier aggregation in the 5G NR network 190 (and optionally the LTE network 160), the carrier aggregation order, the MIMO order, the available bandwidth, ENDC availability, or values of the one or more quality metrics. For example, if the expected data throughput is estimated to be higher for the LTE network 160, and/or values of the one or more quality metrics for the 5G NR network 190 is less than associated predetermined thresholds, the LTE network 160 subscription may be selected as the DDS.

For example, in one implementation, the UE 104 may support multiple carrier subscriptions, e.g., MSIM, including two LTE networks, and the DDS may be subscription 1 (e.g., for LTE1 network), and the UE 104 supports 5G non-standalone mode (NSA) and/or ENDC. When both subscriptions are camped to LTE in IDLE mode, the "upper layer indication" information element (IE) may be monitored for both LTE cells of the two LTE subscriptions to determine which subscription supports ENDC mode. The DDS may then be dynamically switched to the LTE subscription that supports ENDC mode, so that in this instance the UE 104 may take advantage of data rates in the 5G NR network when appropriate.

In another implementation, the UE 104 may support multiple carrier subscriptions, e.g., MSIM, including a 5G NR network and an LTE network. Rather than simply selecting the 5G NR network subscription as the DDS based on an assumption of superior data rates, the DDS may be dynamically selected or switched based on expected data throughput, e.g., determined based on the availability of carrier aggregation in the 5G NR network 190 (and optionally the LTE network 160), the carrier aggregation order, the MIMO order, the available bandwidth, ENDC availability, and/or quality metrics and other factors. For example, expected data throughput factors such as availability of carrier aggregation on the 5G NR network 190 (e.g., compared to availability carrier aggregation on the LTE network 160) at the location, carrier aggregation orders at the location, MIMO orders at the location, available bandwidth on the 5G NR network 190 at a particular location, availability of carrier aggregation on the 5G NR network 190 (e.g., compared to availability carrier aggregation on the LTE network 160) at the location, and whether ENDC is available may be used to determine whether to select the 5G NR network 190 or the LTE network 160 as the DDS. Additionally, the values of quality metrics for parameters such as SS-RSRP, SS-RSRQ, CSI-RS RSRP, CSI-RSRQ on the 5G NR network 190 may be monitored and compared to associated predetermined thresholds to determine whether to select the 5G NR network 190 or the LTE network 160 as the DDS.

Figure 3:
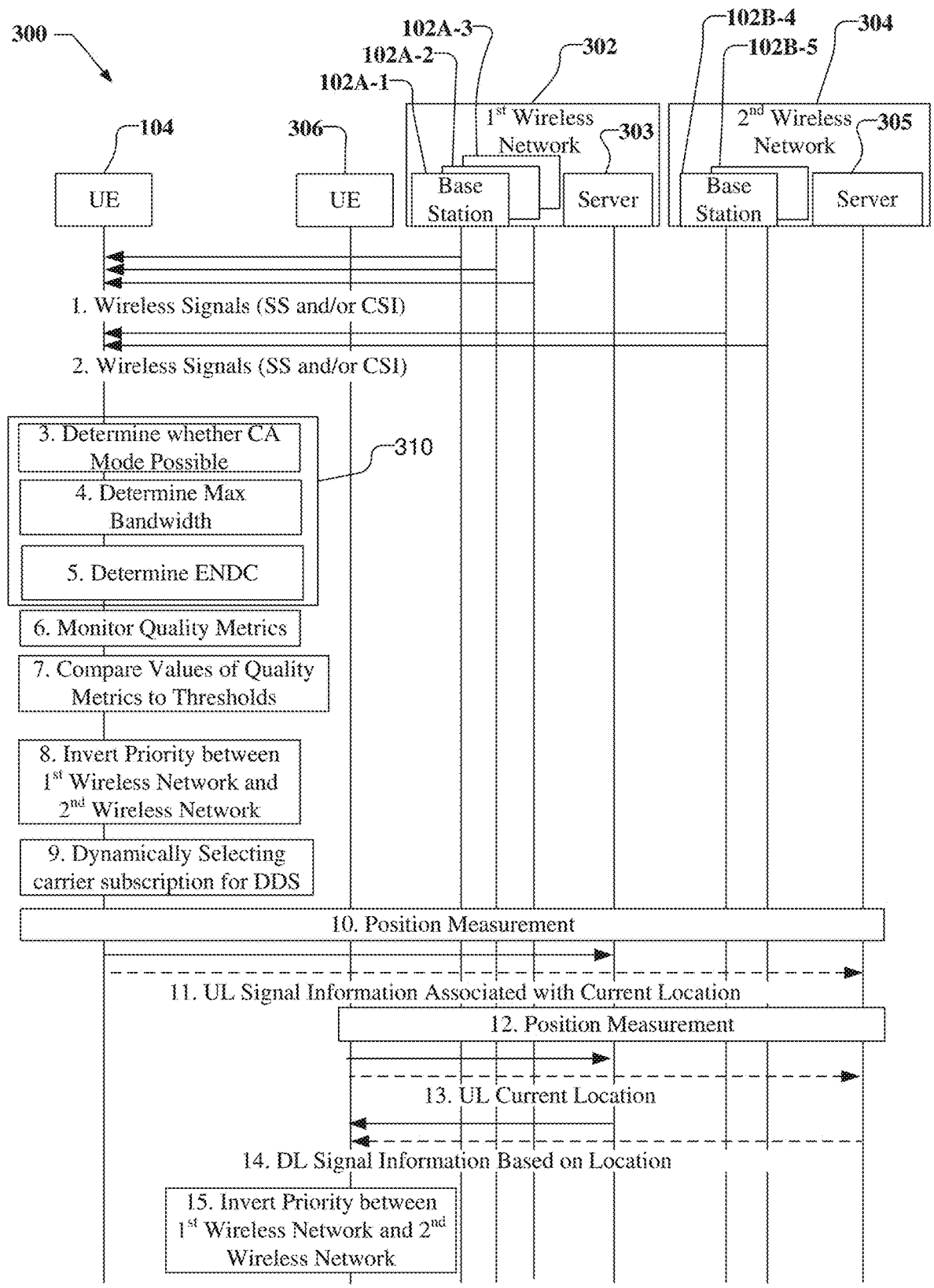
FIG. 3 illustrates a message flow illustrating communications between various components of a wireless communications system.

FIG. 3 illustrates an example message flow 300 illustrating communications between various components of a wireless communications system, such as wireless communications system 100 discussed with reference to FIG. 1, including multiple wireless networks supporting wireless communications with a UE 104 and a second UE 306, which may be similar to UE 104. As mentioned previously, techniques disclosed herein are not necessarily limited to the architecture illustrated in FIG. 1. As illustrated, a first wireless network 302, which may be, e.g., a cellular network such as a 5G NR network, includes a number of base stations, e.g., 102A-1, 102A-2, and 102A-3 (which may be gNBs), and a location server 303, which may be, e.g., LMF 196 shown in FIG. 1. In some implementations, the first wireless network 302 may be another type of wireless network, such as an LTE network. A second wireless network 304 may be another cellular network such as an LTE network. The second wireless network 304 is distinct from the first wireless network 302 and includes a separate set of base stations 102B-4 and 102B-5 (which may be eNBs) and may include a location server 305, which may be, e.g., E-SMLC 165 or H-SLP 170 shown in FIG. 1. In some implementations, the second wireless network 302 may be another type of wireless network, such as a 3G network, 2G network, etc. The UE 104 is configured to support the first wireless network 302 and the second wireless network 304. There may be one or more preliminary stages not shown in FIG. 3, such as capabilities request and response, a request and response of assistance data, a positioning request, etc. For example, in a preliminary stage the UE 104 may assign a higher priority for connection to the first wireless network 302 than the second wireless network 304, e.g., by default.

At stage 1, the UE 104 may receive wireless signals from base stations 102A-1, 102A-2, and 102A-3 (collectively sometimes referred to as base stations 102A) in first wireless network 302 at the current location of the UE 104. The UE 104 may be in an idle mode or connected mode. For example, the UE 104 may receive Synchronization Signals (SS) and/or Channel State Information (CSI) from the base stations.

At stage 2, the UE 104 may additionally receive wireless signals from base stations 102B-4 and 102B-5 (collectively sometimes referred to as base stations 102B) in second wireless network 304 at the current location of the UE 104, e.g., where the UE 104 supports ENDC. For example, the UE 104 may receive Synchronization Signals (SS) and/or Channel State Information (CSI) from the base stations.

At block 310, the UE 104 may estimate the expected data throughput for the first wireless network 302, e.g., using the signals received at stage 1. Optionally, the UE 104 may additionally estimate the expected data throughput for the second wireless network 304, e.g., using the signals received at stage 2. The expected data throughput may be estimated in various manners, as illustrated in stages 3, 4, and 5.

At stage 3, the UE 104 may estimate the expected data throughput by determining whether carrier aggregation is possible at the location of the UE 104 based on the received wireless signals, e.g., from base stations 102A (and optionally from base stations 102B). As discussed above, the UE 104 may determine the carrier aggregation order of one or both networks 302 and 304, e.g., by searching the availability of frequencies on supported carrier aggregation band combinations. The UE 104 may additionally or alternatively determine the MIMO orders, e.g., MIMO layers, available at the location, by determining the rank using a reference signal from a serving base station from one or both networks 302 and 304.

At stage 4, the UE 104 may estimate the expected data throughput by determining the maximum bandwidth supported by one or more of the base stations 102A in the first wireless network 302 (and optionally from base stations 102B in the second wireless network 304). The maximum bandwidth may be determined based on the cell capability at the location of the UE 104 as well as the frequency band of operations of the serving cell. In some implementations, the UE 104 may cache the bandwidth of different bandwidth parts (BWP) configured for one or more base stations and use the cached bandwidths to estimate the total available bandwidth.

At stage 5, the UE 104 may estimate the expected data throughput by determining if the ENDC is available at the current location of the UE 104, e.g., based on the upper layer indication IE in the wireless signals.

At stage 6, the UE 104 may additionally monitor one or more quality metrics of the received wireless signals from base stations 102A in the first wireless network 302. For example, the UE may monitor quality metrics such as SS-RSRP, SS-RSSI, and SS-RSRQ, if the UE is in idle mode, or SS-RSRP, SS-RSSI, SS-RSRQ, CSI-RSRP, CSI-RSSI, and CSI-RSRQ if the UE is in active mode. If wireless signals were received from base stations 102B in the second wireless network 304 at stage 2, the UE 104 may additionally monitor one or more quality metrics of wireless signals received from base stations 102B.

At stage 7, the UE 104 may compare the values of the quality metrics to associated predetermined thresholds. For example, if the UE 104 is in idle mode while it monitored the quality metrics in stage, 2, the UE 104 may cache the values of the quality metrics until the UE 104 is in connected mode, and then compare the values of the quality metrics to associated predetermined thresholds. If one or more quality metrics were monitored for wireless signals from base stations 102B in the second wireless network 304 at stage 6, the UE 104 may additionally compare the values of these quality metrics to associated predetermined thresholds.

At stage 8, the UE 104 may invert the assigned priority for the first wireless network 302 and the second wireless network 304, e.g., assigning a higher priority for connection to the second wireless network than the first wireless network. The inversion of the assigned priority may be based, e.g., at least partially to the estimated expected data throughput, e.g., determined based on the availability of carrier aggregation, the carrier aggregation order, the MIMO order, the available bandwidth, ENDC availability, or the values of one or more of the quality metrics being less than the associated predetermined thresholds at stage 7 and/or the values of one or more quality metrics for the base stations 102B from the second wireless network 304 being greater than the associated predetermined thresholds.

At stage 9, if the UE 104 has multiple carrier subscriptions and supports DDS, the UE 104 may dynamically select a carrier subscription for DDS that is associated with the first wireless network 302 or associated with the second wireless network 304 based on the estimated expected data throughput, e.g., determined based on the availability of carrier aggregation, the carrier aggregation order, the MIMO order, the available bandwidth, ENDC availability, or one or more of the values of the quality metrics for the base stations 102A of the first wireless network 302 being less than the associated predetermined thresholds, or quality metrics for the base stations 102B from the second wireless network 304 being greater than the associated predetermined thresholds, or any combination thereof.

At stage 10, the UE 104 may engage in a position session, e.g., using a satellite based positioning process or terrestrial based positioning process, e.g., measuring positioning reference signals from base stations 102A and/or 102B to generate position measurements from which a position estimate of the UE 104 may be determined. The position estimate may be determined, for example, in a UE assisted positioning process, for example, using a location server in the first wireless network 302 (which may be the same or different than server 303) or a location server in the second wireless network 304 (which may be the same or different than server 305), or in a UE based positioning process.

At stage 11, the UE 104 may attach location information for the current location of the UE 104, e.g., as determined in stage 10, to signal information, e.g., whether priority was inverted in stage 8, or information such as the estimated expected data throughput, e.g., determined based on the availability of carrier aggregation, the carrier aggregation order, the MIMO order, the available bandwidth, ENDC availability, or one or more of the values of the quality metrics for the base stations 102A of the first wireless network 302 being less than the associated predetermined thresholds, or quality metrics for the base stations 102B from the second wireless network 304 being greater than the associated predetermined thresholds, or any combination thereof. The UE 104 uploads the signal information with associated location information to server 303 in the first wireless network 302 and/or the server 305 in the second wireless network. Additionally, the UE 104 may internally store the signal information associated with location information. If the UE 104 is in the same location at a later time, the UE 104 may use location information to obtain the signaling information, and use the retrieved signal information to invert priority between networks or dynamically select carrier subscriptions for DDS for that location.

At stage 12, the second UE 306 may engage in a position sessions similar to that discussed in stage 10, e.g., using a satellite based positioning process or terrestrial based positioning process, e.g., measuring positioning reference signals from base stations 102A and/or 102B to generate position measurements from which a position estimate of the UE 104 may be determined. The position estimate may be determined, for example, in a UE assisted positioning process, for example, using a location server in the first wireless network 302 (which may be the same or different than server 303) or a location server in the second wireless network 304 (which may be the same or different than server 305), or in a UE based positioning process.

At stage 13, the second UE 306 may upload its current location information to server 303 in the first network 302 and/or the server 305 in the second wireless network.

At stage 14, in response to receiving the current location information for the second UE 306, the server 303 in the first network 302 and/or the server 305 in the second wireless network may download signal information to the second UE 306 based on the current location of the second UE 306. For example, if the second UE 306 is in the same location as UE 104 for which UE 104 generated signaling information and uploaded the signaling information associated with location information in stage 11, the server 303 and/or server 305 may download the same signaling information to the second UE 306.

At stage 15, the second UE 306 may invert the assigned priority for the first wireless network 302 than the second wireless network 304 based on the signaling information received at stage 14.

Figure 4:
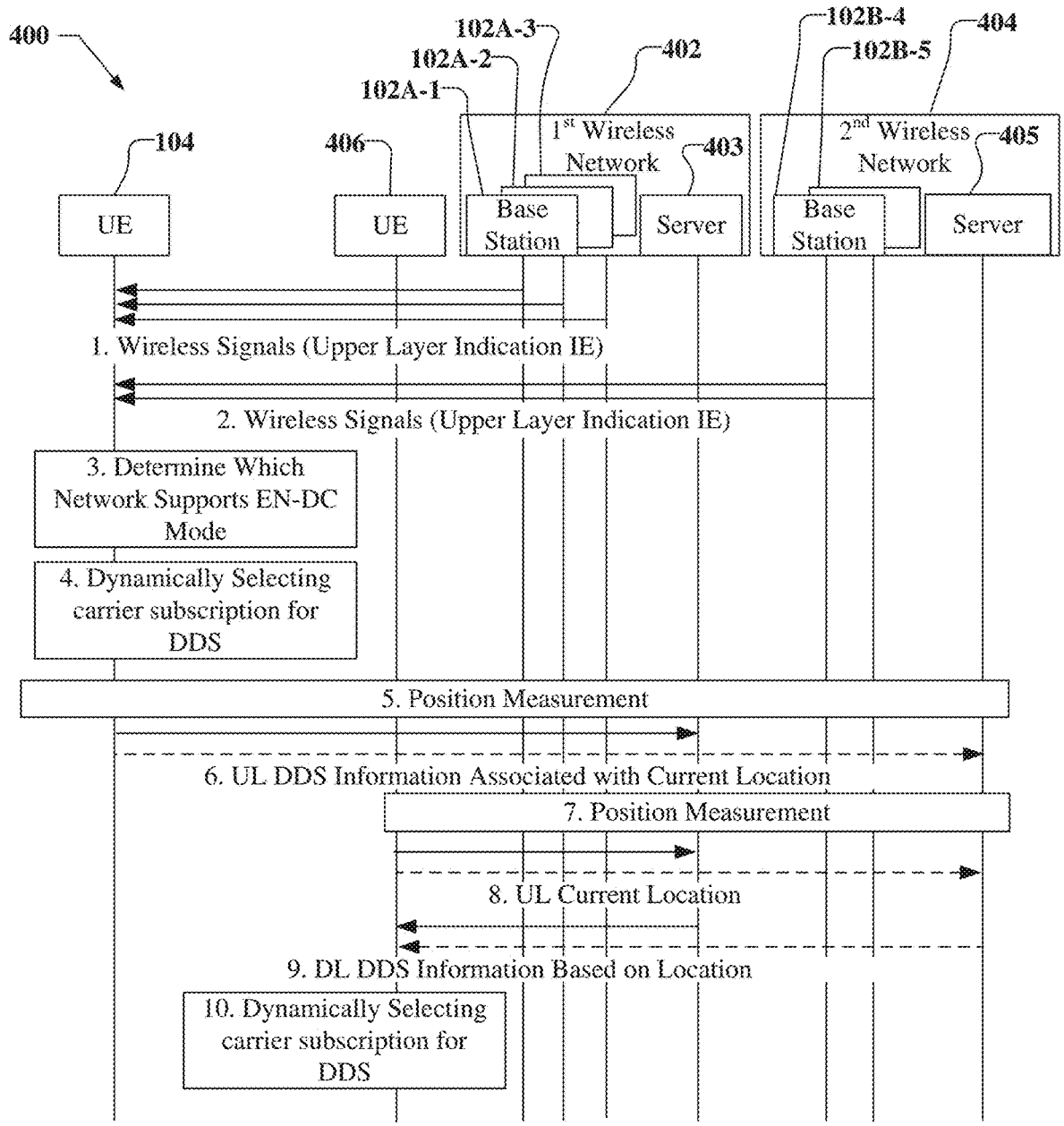
FIG. 4 illustrates a message flow illustrating communications between various components of a wireless communications system.

FIG. 4 illustrates an example message flow 400 illustrating communications between various components of a wireless communications system, such as wireless communications system 100 discussed with reference to FIG. 1, including multiple wireless networks, supporting wireless communications with a UE 104 and a second UE 406, which may be similar to UE 104. As mentioned previously, techniques disclosed herein are not necessarily limited to the architecture illustrated in FIG. 1. The UE 104 has multiple carrier subscriptions, e.g., a first carrier subscription and a second carrier subscription, and supports ENDC, and supports DDS. A first wireless network 402, which may be, e.g., a cellular network such as a LTE network, is associated with the first carrier subscription, and the second wireless network 404, which may also be, e.g., a cellular network such as a LTE network, is associated with the second carrier subscription. There may be one or more preliminary stages not shown in FIG. 4, such as capabilities request and response, a request and response of assistance data, a positioning request, etc. For example, in a preliminary stage the UE 104 may assign a higher priority for connection to the first wireless network 402 than the second wireless network 404, e.g., by default.

At stage 1, the UE 104 receives wireless signals from base stations 102A-1, 102A-2, and 102A-3 (collectively sometimes referred to as base stations 102A) in first wireless network 402 at the current location of the UE 104. The UE 104 may be in an idle mode. The wireless signals may include an upper layer indication IE which may indicate whether the base stations 102A in the first wireless network 402 support ENDC mode.

At stage 2, the UE 104 receives wireless signals from base stations 102B-4 and 102B-5 (collectively sometimes referred to as base stations 102B) in second wireless network 404 at the current location of the UE 104. The UE 104 may be in an idle mode. The wireless signals may include an upper layer indication IE which may indicate whether the base stations 102B in the second wireless network 404 support ENDC mode.

At stage 3, the UE 104 may determine which, if any, of the first wireless network 402 and the second wireless network 404 support ENDC mode based on the upper layer indication IE in the wireless signals received at stages 1 and 2.

At stage 4, the UE 104 may dynamically select a carrier subscription for DDS that is associated with the first wireless network 402 or associated with the second wireless network 404 based on which wireless network supports ENDC mode as determined at stage 3.

At stage 5, the UE 104 may engage in a position sessions, e.g., using a satellite based positioning process or terrestrial based positioning process, e.g., measuring positioning reference signals from base stations 102A and/or 102B to generate position measurements from which a position estimate of the UE 104 may be determined. The position estimate may be determined, for example, in a UE assisted positioning process, for example, using a location server in the first wireless network 402 (which may be the same or different than server 403) or a location server in the second wireless network 404 (which may be the same or different than server 405), or in a UE based positioning process.

At stage 6, the UE 104 may attach location information for the current location of the UE 104, e.g., as determined in stage 5, to DDS information, e.g., which carrier subscription was selected for DDS or which carrier subscription supports and/or does not support ENDC as determined at stage 3. The UE 104 uploads the DDS information with associated location information to server 403 in the first wireless network 402 and/or the server 405 in the second wireless network. Additionally, the UE 104 may internally store the DDS information associated with location information. If the UE 104 is in the same location at a later time, the UE 104 may use location information to obtain the DDS information, and use the retrieved DDS information to dynamically select a carrier subscription for DDS for that current location.

At stage 7, the second UE 406 may engage in a position sessions similar to that discussed in stage 5, e.g., using a satellite based positioning process or terrestrial based positioning process, e.g., measuring positioning reference signals from base stations 102A and/or 102B to generate position measurements from which a position estimate of the UE 104 may be determined. The position estimate may be determined, for example, in a UE assisted positioning process, for example, using a location server in the first wireless network 402 (which may be the same or different than server 403) or a location server in the second wireless network 404 (which may be the same or different than server 405), or in a UE based positioning process.

At stage 8, the second UE 406 may upload its current location information to server 403 in the first network 402 and/or the server 405 in the second wireless network.

At stage 9, in response to receiving the current location information for the second UE 406, the server 403 in the first network 402 and/or the server 405 in the second wireless network may download DDS information to the second UE 406 based on the current location of the second UE 406. For example, if the second UE 406 is in the same location as UE 104 for which UE 104 generated DDS information and uploaded the DDS information associated with location information in stage 6, the server 403 and/or server 405 may download the same signaling information to the second UE 406.

At stage 10, the second UE 406 may use the DDS information received at stage 9 to dynamically select a carrier subscription for DDS for that current location.

Figure 5:
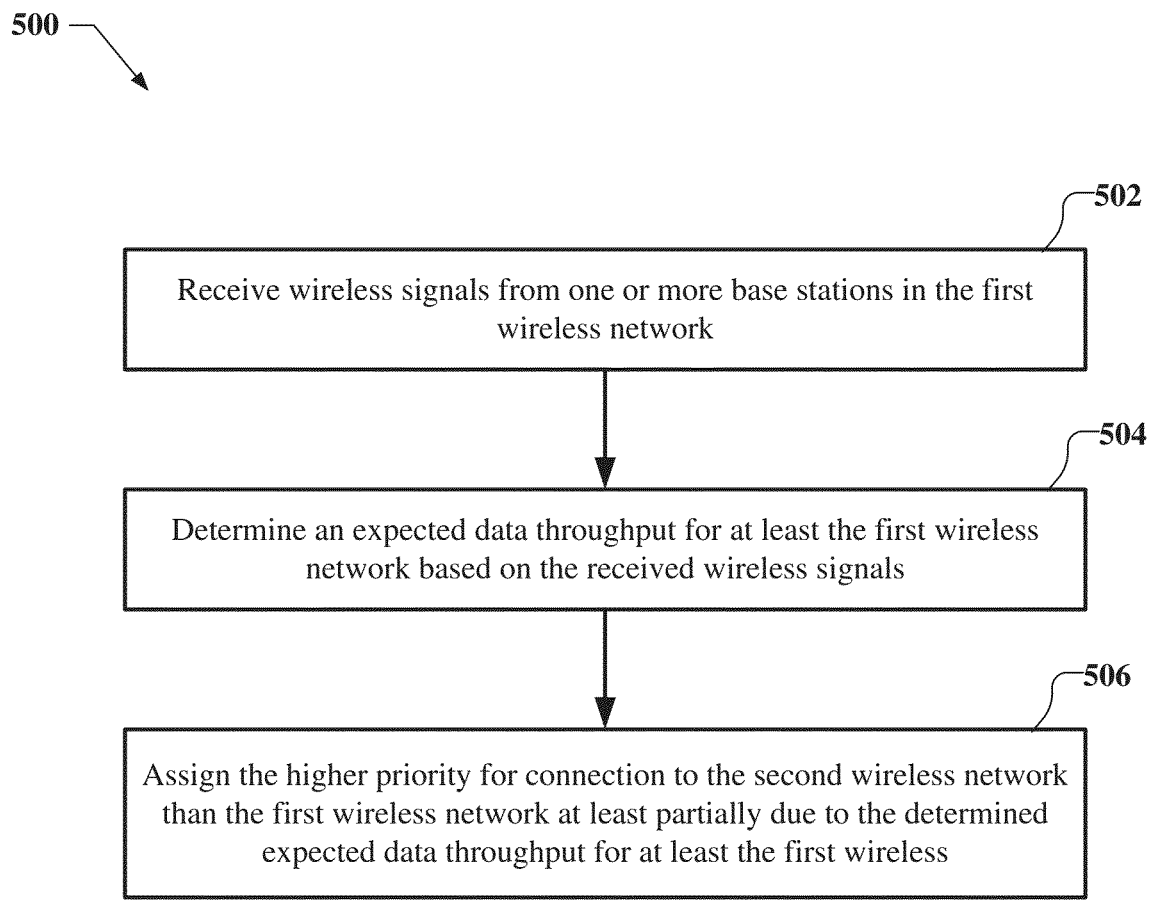
FIG. 5 shows a flowchart of an example procedure for wireless communication of a user equipment (UE), performed by the UE.

FIG. 5 shows a flowchart of an example procedure 500 for wireless communication of a user equipment (UE), such as UE 104, performed by the UE. The UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN). The UE, by default, may assign a higher priority for connection to the first wireless network than the second wireless network.

As illustrated, at block 502, wireless signals from one or more base stations in the first wireless network are received, e.g., as discussed at stage 1 of FIG. 3. At block 504, an expected data throughput for at least the first wireless network is determined based on the received wireless signals, e.g., as discussed at box 310 and stages 3-5 of FIG. 3. At block 506, the higher priority for connection is assigned to the second wireless network than the first wireless network at least partially due to the determined expected data throughput for at least the first wireless network, e.g., as discussed at stage 8 of FIG. 3.

In one implementation, determining the expected data throughput for at least the first wireless network may include determining whether a carrier aggregation mode is possible for at least the first wireless network based on the received wireless signals from the one or more base stations, wherein assigning the higher priority for connection to the second wireless network than the first wireless network is at least partially due to whether the carrier aggregation mode is possible, e.g., as discussed at stages 3 and 8 of FIG. 3. For example, determining the expected data throughput for at least the first wireless network may further include determining a number of carriers available to be aggregated in the second wireless network by searching availability of frequencies on supported carrier aggregation band combinations in the second wireless network, e.g., as discussed at stages 3 and 8 of FIG. 3. In another example, determining the expected data throughput for at least the first wireless network may further include determining a number of multiple input, multiple output (MIMO) layers to communicate with a serving base station by determining rank using a reference signal from the serving base station, e.g., as discussed at stages 3 and 8 of FIG. 3.

In one implementation, determining the expected data throughput from the first wireless network and the second wireless network may include determining a maximum bandwidth supported by the one or more base stations in the first wireless network based on base station capability and band of operation for the wireless signals from the one or more base stations, wherein assigning the higher priority for connection to the second wireless network than the first wireless network is at least partially due to the maximum bandwidth supported by the one or more base stations, e.g., as discussed at stages 4 and 8 of FIG. 3.

In one implementation, the UE supports E-UTRAN NR—Dual Connectivity (ENDC), and determining the expected data throughput for at least the first wireless network may include determining whether ENDC is available at a current location of the UE, wherein assigning the higher priority for connection to the second wireless network than the first wireless network is at least partially due to availability of ENDC at the current location of the UE, e.g., as discussed at stages 5 and 8 of FIG. 3.

In one implementation, the UE may attach location information for a current location of the UE to signal information comprising one or more of the determined expected data throughput for at least the first wireless network and the assignment of the higher priority for connection to the second wireless network than the first wireless network, or a combination thereof, e.g., as discussed at stages 10 and 11 of FIG. 3. The UE may upload the signal information and attached location information to a server, e.g., as discussed at stage 11 of FIG. 3.

In one implementation, the UE may have multiple carrier subscriptions, wherein the first wireless network is associated with a first carrier subscription and the second wireless network is associated with a second carrier subscription, and the UE supports Default Data Subscription (DDS), and the UE may dynamically select the first carrier subscription or the second carrier subscription for DDS, wherein the second carrier subscription is selected for DDS at least partially due to determined expected data throughput for at least the first wireless network, e.g., as discussed at stage 9 of FIG. 3.

In one implementation, the UE may further monitor one or more quality metrics of the received wireless signals from the first wireless network, e.g., as discussed at stage 6 of FIG. 3. The UE may compare values of the one or more quality metrics to associated predetermined thresholds, e.g., as discussed at stage 7 of FIG. 3. The UE may assign the higher priority for connection to the second wireless network than the first wireless network further at least partially due to the values of the one or more quality metrics being less than the associated predetermined thresholds, e.g., as discussed at stage 8 of FIG. 3. In one example, the UE receives the wireless signals from the first wireless network and monitors the one or more quality metrics of the received wireless signals while in idle mode, e.g., as discussed at stages 1 and 6 of FIG. 3. The received wireless signals may be Synchronization Signals (SS) and monitoring the one or more quality metrics of the received wireless signals may include monitoring values of one or more of SS Reference Signal Received Power (SS-RSRP), SS Received Signal Strength Indicator (SS-RSSI), SS Reference Signal Received Quality (SS-RSRQ), e.g., as discussed at stage 6 of FIG. 3. In one example, monitoring the one or more quality metrics of the received wireless signals may include caching the values of the one or more quality metrics of the received wireless signals until the UE is in connected mode and comparing the values of the one or more quality metrics to the associated predetermined thresholds is performed while the UE is in the connected mode, e.g., as discussed at stage 7 of FIG. 3. The UE may receive the wireless signals from the first wireless network and monitor the one or more quality metrics of the received wireless signals while in connected mode, e.g., as discussed at stages 1 and 6 of FIG. 3. The received wireless signals may include at least one of Synchronization Signals (SS) and Channel State Information (CSI) and monitoring the one or more quality metrics of the received wireless signals comprises monitoring values of one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ, e.g., as discussed at stage 6 of FIG. 3.

Figure 6:
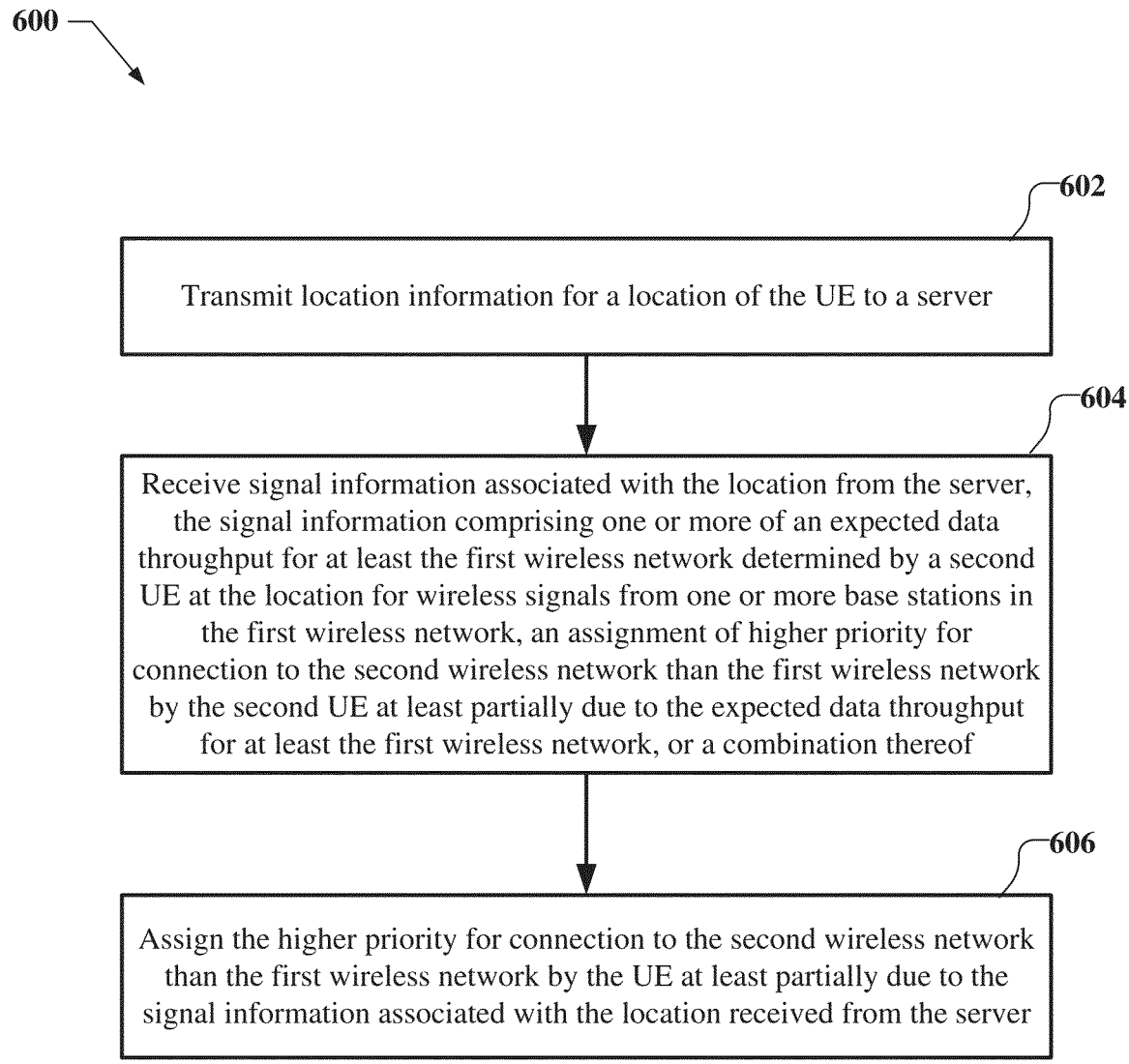
FIG. 6 shows a flowchart of another example procedure for wireless communication of a UE, performed by the UE.

FIG. 6 shows a flowchart of an example procedure 600 method for wireless communication of a user equipment (UE), such as UE 104, performed by the UE. The UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN). The UE, by default, may assign a higher priority for connection to the first wireless network than the second wireless network.

As illustrated, at block 602, location information for a location of the UE is transmitted to a server, e.g., as discussed at stage 13 of FIG. 3. At block 604, signal information associated with the location is received from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof, e.g., as discussed at stage 14 of FIG. 3. At block 606, a higher priority for connection is assigned to the second wireless network than the first wireless network by the UE at least partially due to the signal information associated with the location received from the server, e.g., as discussed at stage 15 of FIG. 3.

In one implementation, the expected data throughput is based on whether a carrier aggregation mode is possible for at least the first wireless network at the location determined by the second UE based on the wireless signals from the one or more base stations, e.g., as discussed at stages 3 and 14 of FIG. 3.

In one implementation, the expected data throughput is further based on a number of carriers available to be aggregated in the second wireless network determined by the second UE based on searching availability of frequencies on supported carrier aggregation band combinations in the second wireless network, e.g., as discussed at stages 3 and 14 of FIG. 3.

In one implementation, the expected data throughput is further based on a number of multiple input, multiple output (MIMO) layers to communicate with a serving base station determined by the second UE based on rank determined using a reference signal from the serving base station, e.g., as discussed at stages 3 and 14 of FIG. 3.

In one implementation, the expected data throughput is based on a maximum bandwidth supported by the one or more base stations at the location determined by the second UE based on base station capability and band of operation for the wireless signals from the one or more base stations, e.g., as discussed at stages 4 and 14 of FIG. 3.

In one implementation, the expected data throughput is further based on whether E-UTRAN NR—Dual Connectivity (ENDC) is available at the location determined by the second UE, e.g., as discussed at stages 5 and 14 of FIG. 3.

In one implementation, the signal information further comprises values of one or more quality metrics measured by the second UE at the location for the wireless signals from the one or more base stations in the first wireless network, e.g., as discussed at stages 7 and 14 of FIG. 3. For example, the wireless signals from the one or more base stations in the first wireless network comprise at least one of Synchronization Signals (SS) and Channel State Information (CSI) and the values of the one or more quality metrics measured by the second UE comprise one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ, e.g., as discussed at stage 6 of FIG. 3. The signal information may further include values of a second set of one or more quality metrics measured at the location by the second UE for wireless signals from the one or more base stations in the second wireless network, e.g., as discussed at stage 6 of FIG. 3.

Figure 7:
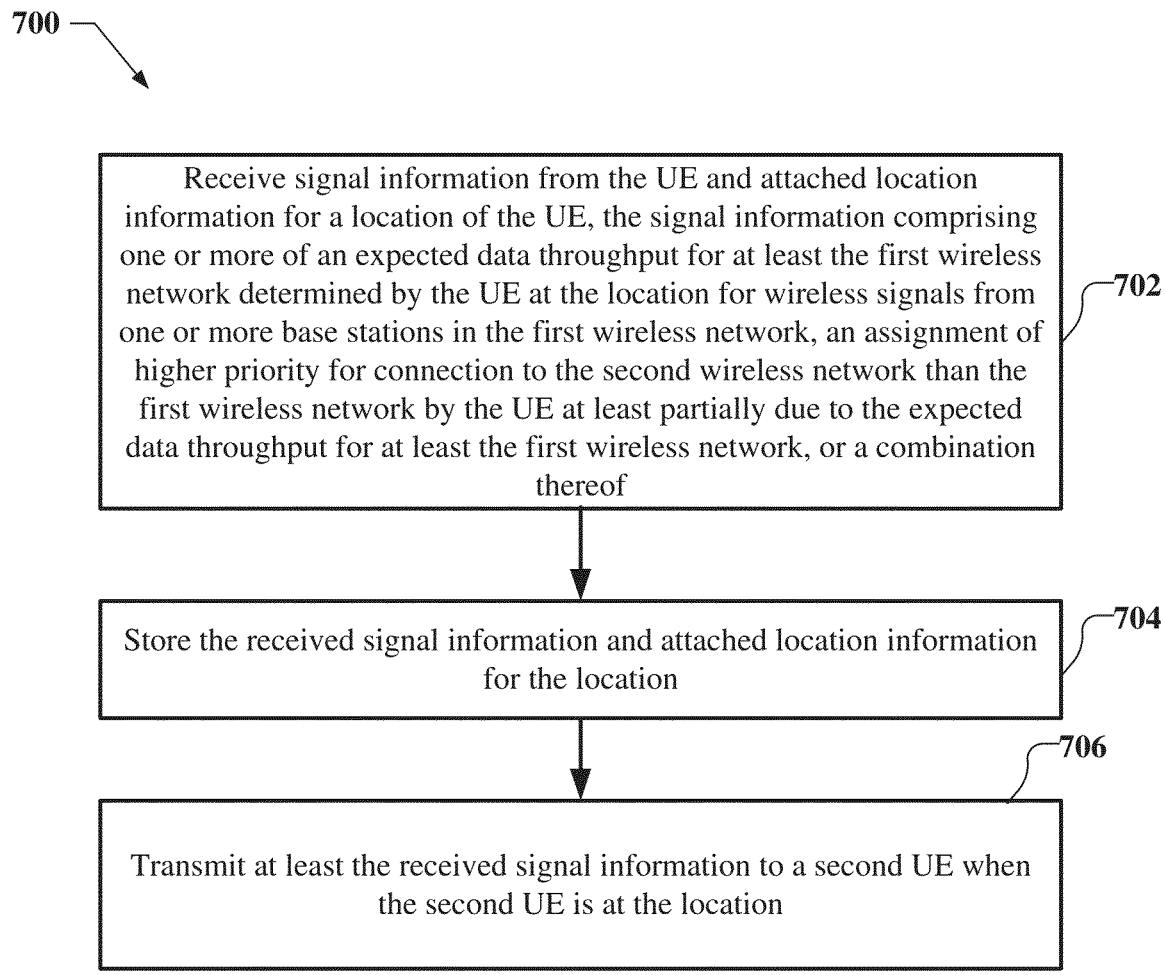
FIG. 7 shows a flowchart of another example procedure for wireless communication of a UE, performed by a server.

FIG. 7 shows a flowchart of an example procedure 700 method for wireless communication of a user equipment (UE), such as UE 104, performed by the server, such as server 303/305 or 403/405. The UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN). The UE, by default, may assign a higher priority for connection to the first wireless network than the second wireless network.

As illustrated, at block 702, signal information from the UE and attached location information for a location of the UE, the signal information comprising one or more of an expected data throughput for at least the first wireless network determined by the UE at the location for wireless signals from one or more base stations in the first wireless network, an assignment of higher priority for connection to the second wireless network than the first wireless network by the UE at least partially due to the expected data throughput for at least the first wireless network, or a combination thereof, e.g., as discussed at box 310 and stages 3-5 of FIG. 3. At block 704, the received signal information and attached location information for the location is stored, e.g., as discussed at stage 11 of FIG. 3. At block 706, at least the received signal information is transmitted to a second UE when the second UE is at the location, e.g., as discussed at stage 14 of FIG. 3.

In one implementation, the expected data throughput is based on whether a carrier aggregation mode is possible for at least the first wireless network at the location determined by the UE based on the wireless signals from the one or more base stations, e.g., as discussed at stages 3 and 11 of FIG. 3.

In one implementation, the expected data throughput is further based on a number of carriers available to be aggregated in the second wireless network determined by the UE based on searching availability of frequencies on supported carrier aggregation band combinations in the second wireless network, e.g., as discussed at stages 3 and 11 of FIG. 3.

In one implementation, the expected data throughput is further based on a number of multiple input, multiple output (MIMO) layers to communicate with a serving base station determined by the UE based on rank determined using a reference signal from the serving base station, e.g., as discussed at stages 3 and 11 of FIG. 3.

In one implementation, the expected data throughput is based on a maximum bandwidth supported by the one or more base stations at the location determined by the UE based on base station capability and band of operation for the wireless signals from the one or more base stations, e.g., as discussed at stages 4 and 11 of FIG. 3.

In one implementation, the expected data throughput is further based on whether E-UTRAN NR—Dual Connectivity (ENDC) is available at the location determined by the UE, e.g., as discussed at stages 5 and 11 of FIG. 3.

In one implementation, the signal information further comprises values of one or more quality metrics measured by the UE at the location for the wireless signals from the one or more base stations in the first wireless network, e.g., as discussed at stages 7 and 11 of FIG. 3. For example, the wireless signals from the one or more base stations in the first wireless network comprise at least one of Synchronization Signals (SS) and Channel State Information (CSI) and the values of the one or more quality metrics measured by the UE comprise one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ, e.g., as discussed at stage 6 of FIG. 3. The signal information may further include values of a second set of one or more quality metrics at the location measured by the UE for wireless signals from the one or more base stations in the second wireless network, e.g., as discussed at stage 6 of FIG. 3.

Figure 8:
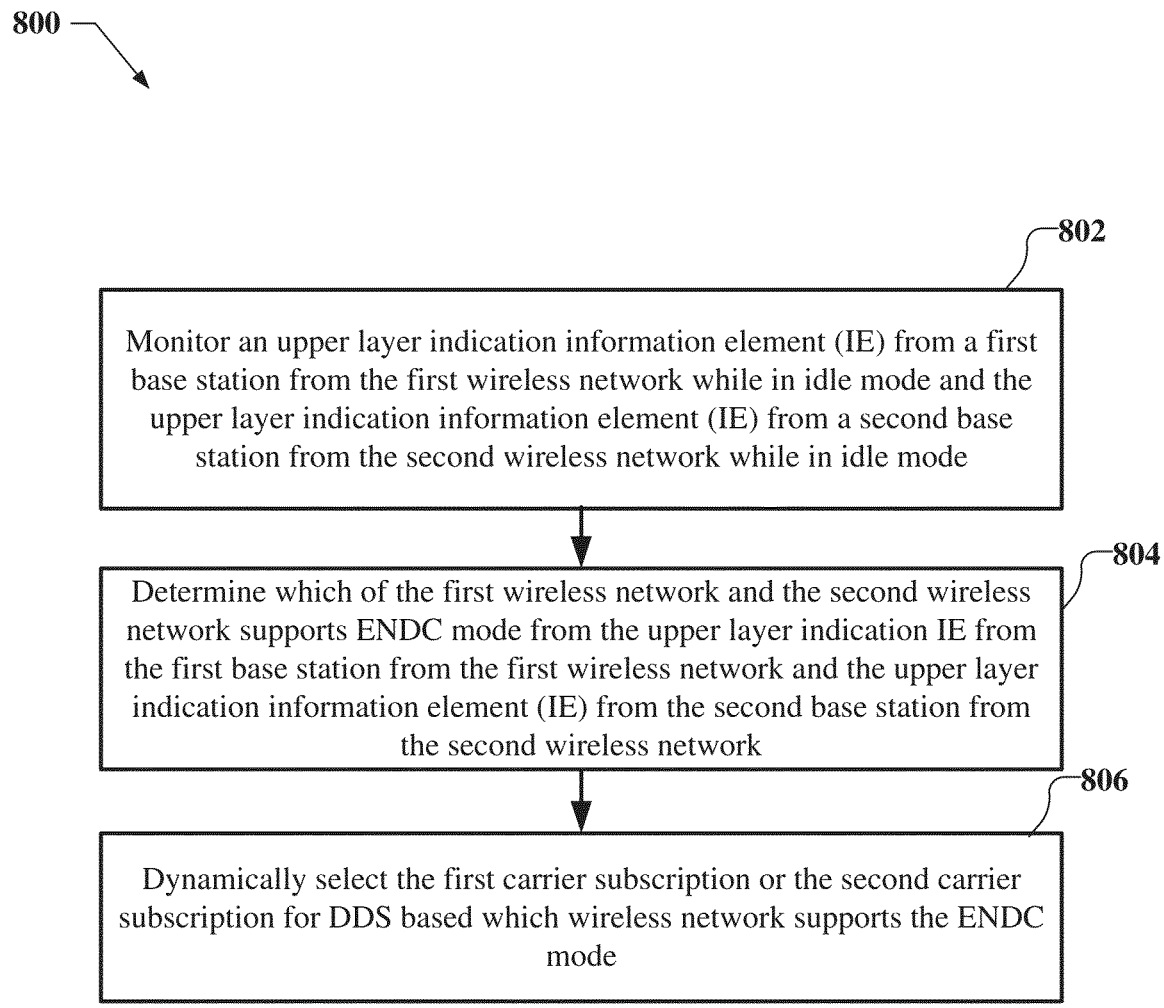
FIG. 8 shows a flowchart of another example procedure for wireless communication of a UE, performed by the UE.

FIG. 8 shows a flowchart of an example procedure 800 method for wireless communication of a user equipment (UE), such as UE 104, performed by the UE. The UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS).

As illustrated, at block 802, an upper layer indication information element (IE) from a first base station from the first wireless network is monitored while the UE is in idle mode and the upper layer indication information element (IE) from a second base station from the second wireless network is monitored while the UE is in idle mode, e.g., as discussed at stages 1 and 2 of FIG. 4. At block 804, the UE determines which of the first wireless network and the second wireless network supports ENDC mode from the upper layer indication IE from the first base station from the first wireless network and the upper layer indication information element (IE) from the second base station from the second wireless network, e.g., as discussed at stage 3 of FIG. 4. At block 806, The UE dynamically selects the first carrier subscription or the second carrier subscription for DDS based which wireless network supports the ENDC mode, e.g., as discussed at stage 4 of FIG. 4.

Figure 9:
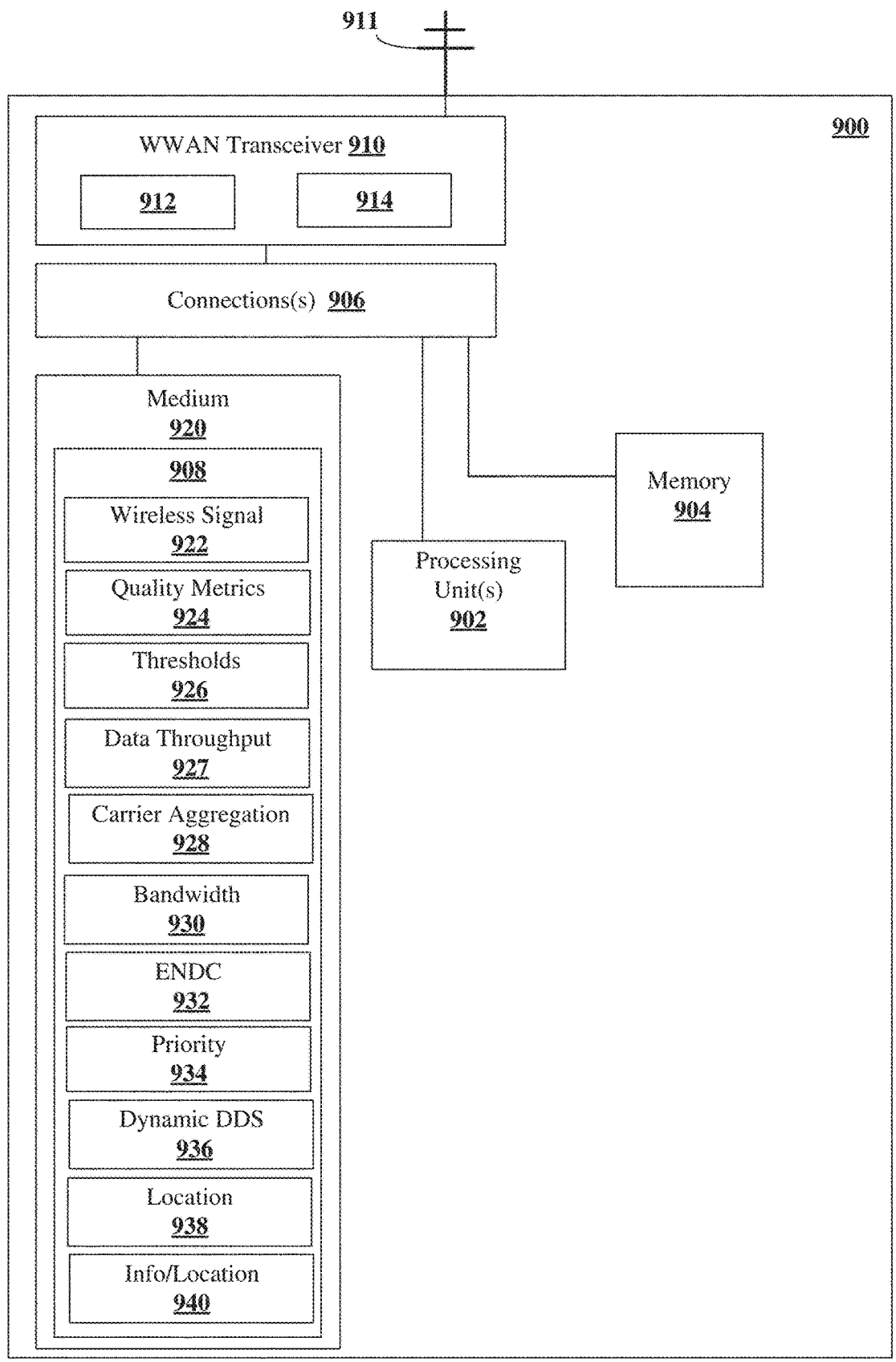
FIG. 9 is a diagram illustrating an example of a hardware implementation of a UE as discussed herein.

FIG. 9 is a diagram illustrating an example of a hardware implementation of a user equipment (UE) 900, such as UE 104. The UE 900 may be capable of connecting to multiple wireless networks, e.g., UE 900 may be a multi-SIM or soft SIM device capable of connecting to multiple wireless networks. The UE 900 may, for example, include one or more processors 902, memory 904, an external interface such as a transceiver 910 (e.g., wireless network interface), which may be operatively coupled with one or more connections 906 (e.g., buses, lines, fibers, links, etc.) to non-transitory computer readable medium 920 and memory 904. The UE 900 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 900 may take the form of a chipset, and/or the like. Transceiver 910 may, for example, include a transmitter 912 enabled to transmit one or more signals over one or more types of wireless communication networks and a receiver 914 to receive one or more signals transmitted over the one or more types of wireless communication networks.

In some embodiments, UE 900 may include antenna 911, which may be internal or external. UE antenna 911 may be used to transmit and/or receive signals processed by transceiver 910. In some embodiments, UE antenna 911 may be coupled to transceiver 910. The transceiver 910 may be capable of transmitting and receiving both WWAN and WLAN signals, or one or more additional transceivers may be included. In some embodiments, measurements of signals received (transmitted) by UE 900 may be performed at the point of connection of the UE antenna 911 and transceiver 910. For example, the measurement point of reference for received (transmitted) RF signal measurements may be an input (output) terminal of the receiver 914 (transmitter 912) and an output (input) terminal of the UE antenna 911. In a UE 900 with multiple UE antennas 911 or antenna arrays, the antenna connector may be viewed as a virtual point representing the aggregate output (input) of multiple UE antennas. In some embodiments, UE 900 may measure received signals including signal strength and TOA measurements and the raw measurements may be processed by the one or more processors 902.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of UE 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in UE 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in UE 900 is merely exemplary, and as such the functionality of the modules and/or data structures may be combined, separated, and/or be structured in different ways depending upon the implementation of the UE 900.

The medium 920 and/or memory 904 may include a wireless signal module 922 that when implemented by the one or more processors 902 configures the one or more processors 902 to receive wireless signals from one or more base stations in wireless networks via transceiver 910. The wireless signals may be received while in idle mode or connected mode.

The medium 920 and/or memory 904 may include a quality metrics module 924 that when implemented by the one or more processors 902 configures the one or more processors 902 to monitor one or more quality metrics of the received wireless signals. For example, quality metrics may include SS-RSRP, SS-RSSI, and SS-RSRQ, if the wireless signals were received while the UE was in idle mode, or SS-RSRP, SS-RSSI, SS-RSRQ, CSI-RSRP, CSI-RSSI, and CSI-RSRQ if the wireless signals were received while the UE was in connected mode.

The medium 920 and/or memory 904 may include a thresholds module 926 that when implemented by the one or more processors 902 configures the one or more processors 902 to comparing values of the one or more quality metrics to associated predetermined thresholds, which may be stored in memory 904 or medium 920.

The medium 920 and/or memory 904 may include a data throughput module 927 that when implemented by the one or more processors 902 configures the one or more processors 902 to determine an expected data throughput for one or more wireless networks based on received signals. The expected data throughput, for example, may be determined based on the availability of carrier aggregation, the carrier aggregation order, the MIMO order, the available bandwidth, ENDC availability.

The medium 920 and/or memory 904 may include a carrier aggregation module 928 that when implemented by the one or more processors 902 configures the one or more processors 902 to determine whether a carrier aggregation mode is possible based on the received wireless signals. The one or more processors 902 may be further configured to determine the carrier aggregation order, e.g., by searching the availability of frequencies on the supported carrier aggregation band combinations. The one or more processors 902 may be further configured to determine the MIMO order or available MIMO layers, e.g., by determining the rank using a reference signal from the base station.

The medium 920 and/or memory 904 may include a bandwidth module 930 that when implemented by the one or more processors 902 configures the one or more processors 902 to determine a maximum bandwidth supported by one or more base stations from which wireless signals were received, e.g., based on the cell capability at the location of the UE 104 as well as the frequency band of operations of the serving cell.

The medium 920 and/or memory 904 may include an ENDC module 932 that when implemented by the one or more processors 902 configures the one or more processors 902 to determine whether ENDC is available, e.g., by monitoring an "upper layer indication" information element (IE) that indicates availability of ENDC. The one or more processors 902 may be further configured to monitor various metrics from a first wireless network and a second wireless network. The ENDC module 932 may further configures the one or more processors 902 to monitor upper layer indication IEs from base stations in multiple wireless networks and determine which wireless network supports ENDC mode.

The medium 920 and/or memory 904 may include a priority module 934 that when implemented by the one or more processors 902 configures the one or more processors 902 to assign a higher priority for connection to a wireless network based on the expected data throughput, e.g., determined based on the availability of carrier aggregation, the carrier aggregation order, the MIMO order, the available bandwidth, ENDC availability, or values of the one or more quality metrics. The priority module 934 may configures the one or more processors 902 to assign a higher priority to one wireless network by default but invert the priority assignment with another wireless network based on the metrics determined by, e.g., one or more of the thresholds module 926, data throughput module 927, carrier aggregation module 928, bandwidth module 930, ENDC module 932, and the information/location module 940.

The medium 920 and/or memory 904 may include a dynamic DDS module 936 that when implemented by the one or more processors 902 configures the one or more processors 902 to dynamically select one carrier subscription over another carrier subscription for DDS based on the metrics determined by, e.g., one or more of the thresholds module 926, carrier aggregation module 928, bandwidth module 930, ENDC module 932, and the information/location module 940.

The medium 920 and/or memory 904 may include a location module 938 that when implemented by the one or more processors 902 configures the one or more processors 902 to determine location information for a current location of the UE 900. The location information may be based on UE assisted or UE based positioning methods, or from satellite positioning, etc.

The medium 920 and/or memory 904 may include an information/location module 940 that when implemented by the one or more processors 902 configures the one or more processors 902 to associate location information for a current location with signal information, such as whether a priority was inverted by priority module 934 or the metrics determined by, e.g., one or more of the thresholds module 926, carrier aggregation module 928, bandwidth module 930, ENDC module 932. The information/location module 940 may further associate location information with DDS information, such as the DDS that was dynamically selected, e.g., by dynamic DDS module 936, or the or the metrics determined by, e.g., one or more of the thresholds module 926, carrier aggregation module 928, bandwidth module 930, ENDC module 932. The information/location module 940 may configure the one or more processors 902 to upload the signal or DDS information and associate location information to a server, e.g., via transceiver 910. Additionally, information/location module 940 may configure the one or more processors 902 to upload a current location of the UE 900 and receive associated signal or DDS information for the location from a server, e.g., via transceiver 910.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support OTDOA measurements in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

A UE, such as UE 900, configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, may include a means for receiving wireless signals from one or more base stations in the first wireless network, which may be, e.g., the wireless transceiver 910, one or more processors 902 with dedicated hardware or implementing executable code or software instructions in memory 904 and/or medium 920 such as the wireless signal module 922. A means for determining an expected data throughput for at least the first wireless network may be, e.g., the one or more processors 902 with dedicated hardware or implementing executable code or software instructions in memory 904 and/or medium 920 such as the data throughput module 927, the carrier aggregation module 928, the bandwidth module 930, or the ENDC module 932. A means for assigning the higher priority for connection to the second wireless network than the first wireless network at least partially due to the determined expected data throughput for at least the first wireless network may be, e.g., the one or more processors 902 with dedicated hardware or implementing executable code or software instructions in memory 904 and/or medium 920 such as the priority module 934.

In one implementation, the means for determining the expected data throughput for at least the first wireless network may be a means for determining whether a carrier aggregation mode is possible for at least the first wireless network based on the received wireless signals from the one or more base stations, wherein assigning the higher priority for connection to the second wireless network than the first wireless network is at least partially due to whether the carrier aggregation mode is possible, which may be, e.g., the one or more processors 902 with dedicated hardware or implementing executable code or software instructions in memory 904 and/or medium 920 such as the data throughput module 927, the carrier aggregation module 928, and the priority module 934.

In one implementation, the means for determining the expected data throughput for at least the first wireless network may further include a means for determining a number of carriers available to be aggregated in the second wireless network by searching availability of frequencies on supported carrier aggregation band combinations in the second wireless network. which may be, e.g., the one or more processors 902 with dedicated hardware or implementing executable code or software instructions in memory 904 and/or medium 920 such as the data throughput module 927, the carrier aggregation module 928, and the priority module 934.

In one implementation, the means for determining the expected data throughput for at least the first wireless network may further include a means for determining a number of multiple input, multiple output (MIMO) layers to communicate with a serving base station by determining rank using a reference signal from the serving base station, which may be, e.g., the one or more processors 902 with dedicated hardware or implementing executable code or software instructions in memory 904 and/or medium 920 such as the data throughput module 927, the carrier aggregation module 928, and the priority module 934.

In one implementation, the means for determining the expected data throughput from the first wireless network and the second wireless network may include a means for determining a maximum bandwidth supported by the one or more base stations in the first wireless network based on base station capability and band of operation for the wireless signals from the one or more base stations, wherein assigning the higher priority for connection to the second wireless network than the first wireless network is at least partially due to the maximum bandwidth supported by the one or more base stations. which may be, e.g., the one or more processors 902 with dedicated hardware or implementing executable code or software instructions in memory 904 and/or medium 920 such as the data throughput module 927, the bandwidth module 930, and the priority module 934.

In one implementation, the UE supports E-UTRAN NR—Dual Connectivity (ENDC), and the means for determining the expected data throughput for at least the first wireless network comprises a means for determining whether ENDC is available at a current location of the UE, wherein assigning the higher priority for connection to the second wireless network than the first wireless network is at least partially due to availability of ENDC at the current location of the UE, which may be, e.g., the one or more processors 902 with dedicated hardware or implementing executable code or software instructions in memory 904 and/or medium 920 such as the data throughput module 927, the ENDC module 932, and the priority module 934.

In one implementation, the UE may further include a means for attaching location information for a current location of the UE to signal information comprising one or more of the determined expected data throughput for at least the first wireless network and the assignment of the higher priority for connection to the second wireless network than the first wireless network, or a combination thereof, which may be, e.g., the one or more processors 902 with dedicated hardware or implementing executable code or software instructions in memory 904 and/or medium 920 such as the location module 938 and the info/location module 940. The UE may a means for uploading the signal information and attached location information to a server, which may be, e.g., the wireless transceiver 910, one or more processors 902 with dedicated hardware or implementing executable code or software instructions in memory 904 and/or medium 920 such as the info/location module 940.

In one implementation, the UE has multiple carrier subscriptions, wherein the first wireless network is associated with a first carrier subscription and the second wireless network is associated with a second carrier subscription, and the UE supports Default Data Subscription (DDS), and the UE may further include a means for dynamically selecting the first carrier subscription or the second carrier subscription for DDS, wherein the second carrier subscription is selected for DDS at least partially due to determined expected data throughput for at least the first wireless network, which may be, e.g., the one or more processors 902 with dedicated hardware or implementing executable code or software instructions in memory 904 and/or medium 920 such as the dynamic DDS module 936.

In one implementation, the UE may further include means for monitoring one or more quality metrics of the received wireless signals from the first wireless network, which may be, e.g., the wireless transceiver 910, one or more processors 902 with dedicated hardware or implementing executable code or software instructions in memory 904 and/or medium 920 such as the quality metrics module 924. A means for comparing values of the one or more quality metrics to associated predetermined thresholds may be, e.g., the one or more processors 902 with dedicated hardware or implementing executable code or software instructions in memory 904 and/or medium 920 such as the thresholds module 926. The means for assigning the higher priority for connection to the second wireless network than the first wireless network further uses at least the values of the one or more quality metrics being less than the associated predetermined thresholds, which may be, e.g., the one or more processors 902 with dedicated hardware or implementing executable code or software instructions in memory 904 and/or medium 920 such as the priority module 934. The means for monitoring the one or more quality metrics of the received wireless signals further comprises caching the values of the one or more quality metrics of the received wireless signals until the UE is in connected mode and comparing the values of the one or more quality metrics to the associated predetermined thresholds is performed while the UE is in the connected mode, which may be, e.g., memory 904 or medium 920, the one or more processors 902 with dedicated hardware or implementing executable code or software instructions in memory 904 and/or medium 920 such as the thresholds module 926.

A UE, such as UE 900, may be configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, and may include a means for transmitting location information for a location of the UE to a server, which may be, e.g., the wireless transceiver 910, one or more processors 902 with dedicated hardware or implementing executable code or software instructions in memory 904 and/or medium 920 such as the location module 938 and the info/location module 940. A means for receiving signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof may be, e.g., the wireless transceiver 910, one or more processors 902 with dedicated hardware or implementing executable code or software instructions in memory 904 and/or medium 920 such as the info/location module 940. A means for assigning the higher priority for connection to the second wireless network than the first wireless network by the UE at least partially due to the signal information associated with the location received from the server may be, e.g., the one or more processors 902 with dedicated hardware or implementing executable code or software instructions in memory 904 and/or medium 920 such as the priority module 934.

A UE, such as UE 900, may be configured for wireless communications, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), and may include a means for monitoring an upper layer indication information element (IE) from a first base station from the first wireless network while in idle mode and the upper layer indication information element (IE) from a second base station from the second wireless network while in idle mode, which may be, e.g., the wireless transceiver 910, one or more processors 902 with dedicated hardware or implementing executable code or software instructions in memory 904 and/or medium 920 such as the wireless signal module 922, and ENDC module 932. A means for determining which of the first wireless network and the second wireless network supports ENDC mode from the upper layer indication IE from the first base station from the first wireless network and the upper layer indication information element (IE) from the second base station from the second wireless network may be, e.g., one or more processors 902 with dedicated hardware or implementing executable code or software instructions in memory 904 and/or medium 920 such as the ENDC module 932. A means for dynamically selecting the first carrier subscription or the second carrier subscription for DDS based which wireless network supports the ENDC mode may be, e.g., one or more processors 902 with dedicated hardware or implementing executable code or software instructions in memory 904 and/or medium 920 such as the dynamic DDS 936.

Figure 10:
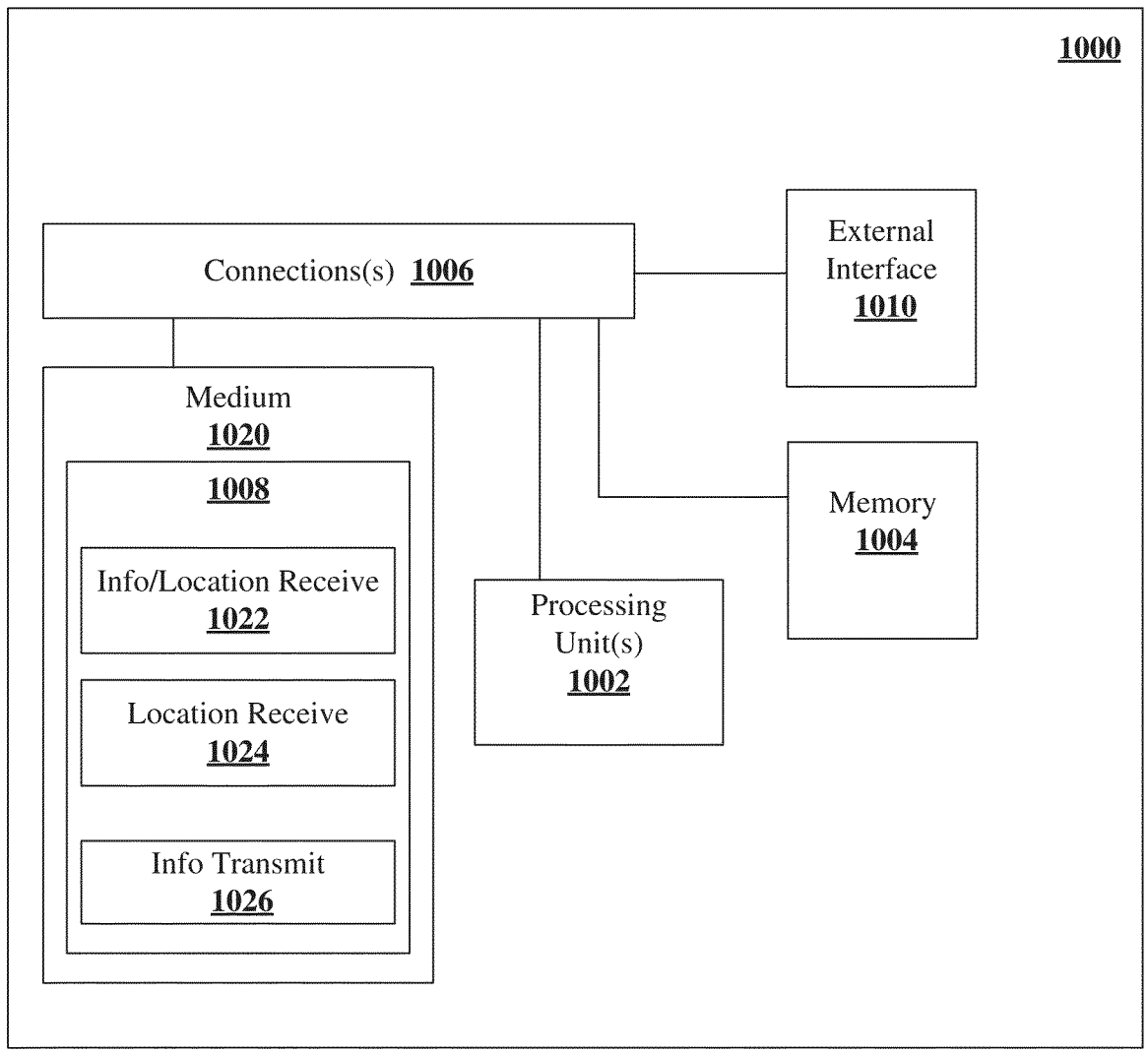
FIG. 10 is a diagram illustrating an example of a hardware implementation of a server as discussed herein.

FIG. 10 shows a schematic block diagram illustrating certain exemplary features of a server 1000, e.g., server 303 or 403 shown in FIGS. 3 and 4 respectively. Server 1000 may, for example, include one or more processors 1002, memory 1004, an external interface, which may include an external interface 1010 (e.g., wired or wireless network interface to other entities in network with which the server 1000 may communicate with a UE), which may be operatively coupled with one or more connections 1006 (e.g., buses, lines, fibers, links, etc.) to non-transitory computer readable medium 1020 and memory 1004. The server 1000 may further include additional items, which are not shown. In certain example implementations, all or part of server 1000 may take the form of a chipset, and/or the like. External interface 1010 may be a wired or wireless interface capable of connecting to other network entities, including a UE.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of server 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in server 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in server 1000 is merely exemplary, and as such the functionality of the modules and/or data structures may be combined, separated, and/or be structured in different ways depending upon the implementation of the server 1000.

The medium 1020 and/or memory 1004 may include an information/location receive module 1022 that when implemented by the one or more processors 1002 configures the one or more processors 1002 to receive, via the external interface 1010, location information for a current location of a UE that is associated with signal information or DDS information for the current location. The information may include a priority assignment for a wireless network at the location of the UE or dynamic selection of one carrier subscription over another for DDS at the location. The information may include one or more of values of one or more quality metrics measured by the UE from one or more base stations in a wireless network or a comparison of the value to an associated predetermined thresholds, whether a carrier aggregation mode is possible at the location, a maximum bandwidth supported at the location determined by the UE based on the wireless signals from the one or more base stations, one or more of values of one or more quality metrics measured by the UE from one or more base stations in a different wireless network or a comparison of the value to an associated predetermined thresholds. The information/location receive module 1022 may configure the one or more processors 1002 to store the received information and associated location information, e.g., in memory 1004 or medium 1020.

The medium 1020 and/or memory 1004 may include a location receive module 1024 that when implemented by the one or more processors 1002 configures the one or more processors 1002 to receive a location or location information from a UE, e.g., via external interface 1010.

The medium 1020 and/or memory 1004 may include an information transit module 1026 that that when implemented by the one or more processors 1002 configures the one or more processors 1002 to retrieve stored information that is associated with a received location and to transmit the information to a UE, via external interface 1010. The information, for example, may be a priority assignment for a wireless network at the location or dynamic selection of one carrier subscription over another for DDS at the location. The information may include one or more of values of one or more quality metrics from one or more base stations in a wireless network or a comparison of the value to an associated predetermined thresholds, whether a carrier aggregation mode is possible at the location, a maximum bandwidth supported at the location based on the wireless signals from the one or more base stations, one or more of values of one or more quality metrics measured from one or more base stations in a different wireless network or a comparison of the value to an associated predetermined thresholds.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support OTDOA measurements in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include an external interface 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

A server, such as server 1000, may be configured for wireless communications with a user equipment (UE) performed by a server, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, and may include a means for receiving signal information from the UE and attached location information for a location of the UE, the signal information comprising one or more of an expected data throughput for at least the first wireless network determined by the UE at the location for wireless signals from one or more base stations in the first wireless network, an assignment of higher priority for connection to the second wireless network than the first wireless network by the UE at least partially due to the expected data throughput for at least the first wireless network, or a combination thereof, which may be, e.g., the external interface 1010, one or more processors 1002 with dedicated hardware or implementing executable code or software instructions in memory 1004 and/or medium 1020 such as the info/location receive module 1022. A means for storing the received signal information and attached location information for the location may be, e.g., memory 1004 or medium 1020, the one or more processors 1002 with dedicated hardware or implementing executable code or software instructions in memory 1004 and/or medium 1020 such as the info/location receive module 1022. A means for transmitting at least the received signal information to a second UE when the second UE is at the location may be, e.g., the external interface 1010, one or more processors 1002 with dedicated hardware or implementing executable code or software instructions in memory 1004 and/or medium 1020 such as the information transmit module 1026.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method for wireless communication of a user equipment (UE) performed by the UE, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the method comprising: transmitting location information for a location of the UE to a server; receiving signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof; and assigning the higher priority for connection to the second wireless network than the first wireless network by the UE at least partially due to the signal information associated with the location received from the server.

There may be some implementations (2) of the above-described method (1) wherein the expected data throughput is based on whether a carrier aggregation mode is possible for at least the first wireless network at the location determined by the second UE based on the wireless signals from the one or more base stations.

There may be some implementations (3) of the above-described method (2) wherein the expected data throughput is further based on a number of carriers available to be aggregated in the second wireless network determined by the second UE based on searching availability of frequencies on supported carrier aggregation band combinations in the second wireless network.

There may be some implementations (4) of the above-described method (2) wherein the expected data throughput is further based on a number of multiple input, multiple output (MIMO) layers to communicate with a serving base station determined by the second UE based on rank determined using a reference signal from the serving base station.

There may be some implementations (5) of the above-described method (1) wherein the expected data throughput is based on a maximum bandwidth supported by the one or more base stations at the location determined by the second UE based on base station capability and band of operation for the wireless signals from the one or more base stations.

There may be some implementations (6) of the above-described method (1) wherein the expected data throughput is further based on whether E-UTRAN NR—Dual Connectivity (ENDC) is available at the location determined by the second UE.

There may be some implementations (7) of the above-described method (1) the signal information further comprises values of one or more quality metrics measured by the second UE at the location for the wireless signals from the one or more base stations in the first wireless network.

There may be some implementations (8) of the above-described method (7) wherein the wireless signals from the one or more base stations in the first wireless network comprise at least one of Synchronization Signals (SS) and Channel State Information (CSI) and the values of the one or more quality metrics measured by the second UE comprise one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ.

There may be some implementations (9) of the above-described method (7) wherein the signal information further comprises values of a second set of one or more quality metrics measured at the location by the second UE for wireless signals from the one or more base stations in the second wireless network.

One implementation (10) may be a user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the UE comprising: a wireless transceiver configured to wirelessly communicate with network entities in a wireless communication system; at least one memory; at least one processor coupled to the wireless transceiver and the at least one memory, wherein the at least one processor is configured to: transmit, via the wireless transceiver, location information for a location of the UE to a server; receive, via the wireless transceiver, signal information associated with the location from the server, the signal information comprising one or more of an expected data throughput for at least the first wireless network determined by a second UE at the location for wireless signals from one or more base stations in the first wireless network, an assignment of higher priority for connection to the second wireless network than the first wireless network by the second UE at least partially due to the expected data throughput for at least the first wireless network, or a combination thereof; and assign the higher priority for connection to the second wireless network than the first wireless network by the UE at least partially due to the signal information associated with the location received from the server.

There may be some implementations (11) of the above-described UE (10) wherein the expected data throughput is based on whether a carrier aggregation mode is possible for at least the first wireless network at the location determined by the second UE based on the wireless signals from the one or more base stations.

There may be some implementations (12) of the above-described UE (11) wherein the expected data throughput is further based on a number of carriers available to be aggregated in the second wireless network determined by the second UE based on searching availability of frequencies on supported carrier aggregation band combinations in the second wireless network.

There may be some implementations (13) of the above-described UE (11) wherein the expected data throughput is further based on a number of multiple input, multiple output (MIMO) layers to communicate with a serving base station determined by the second UE based on rank determined using a reference signal from the serving base station.

There may be some implementations (14) of the above-described UE (10) wherein the expected data throughput is based on a maximum bandwidth supported by the one or more base stations at the location determined by the second UE based on base station capability and band of operation for the wireless signals from the one or more base stations.

There may be some implementations (15) of the above-described UE (10) wherein the expected data throughput is further based on whether E-UTRAN NR—Dual Connectivity (ENDC) is available at the location determined by the second UE.

There may be some implementations (16) of the above-described UE (10) the signal information further comprises values of one or more quality metrics measured by the second UE at the location for the wireless signals from the one or more base stations in the first wireless network.

There may be some implementations (17) of the above-described UE (16) wherein the wireless signals from the one or more base stations in the first wireless network comprise at least one of Synchronization Signals (SS) and Channel State Information (CSI) and the values of the one or more quality metrics measured by the second UE comprise one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ.

There may be some implementations (18) of the above-described UE (16) wherein the signal information further comprises values of a second set of one or more quality metrics measured at the location by the second UE for wireless signals from the one or more base stations in the second wireless network.

One implementation (19) may be a method for wireless communication of a user equipment (UE) performed by a server, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the method comprising: receiving signal information from the UE and attached location information for a location of the UE, the signal information comprising one or more of an expected data throughput for at least the first wireless network determined by the UE at the location for wireless signals from one or more base stations in the first wireless network, an assignment of higher priority for connection to the second wireless network than the first wireless network by the UE at least partially due to the expected data throughput for at least the first wireless network, or a combination thereof; storing the received signal information and attached location information for the location; and transmitting at least the received signal information to a second UE when the second UE is at the location.

There may be some implementations (20) of the above-described method (19) wherein the expected data throughput is based on whether a carrier aggregation mode is possible for at least the first wireless network at the location determined by the UE based on the wireless signals from the one or more base stations.

There may be some implementations (21) of the above-described method (20) wherein the expected data throughput is further based on a number of carriers available to be aggregated in the second wireless network determined by the UE based on searching availability of frequencies on supported carrier aggregation band combinations in the second wireless network.

There may be some implementations (22) of the above-described method (20) wherein the expected data throughput is further based on a number of multiple input, multiple output (MIMO) layers to communicate with a serving base station determined by the UE based on rank determined using a reference signal from the serving base station.

There may be some implementations (23) of the above-described method (19) wherein the expected data throughput is based on a maximum bandwidth supported by the one or more base stations at the location determined by the UE based on base station capability and band of operation for the wireless signals from the one or more base stations.

There may be some implementations (24) of the above-described method (19) wherein the expected data throughput is further based on whether E-UTRAN NR—Dual Connectivity (ENDC) is available at the location determined by the UE.

There may be some implementations (25) of the above-described method (19) the signal information further comprises values of one or more quality metrics measured by the UE at the location for the wireless signals from the one or more base stations in the first wireless network.

There may be some implementations (26) of the above-described method (25) wherein the wireless signals from the one or more base stations in the first wireless network comprise at least one of Synchronization Signals (SS) and Channel State Information (CSI) and the values of the one or more quality metrics measured by the UE comprise one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ.

There may be some implementations (27) of the above-described method (25) wherein the signal information further comprises values of a second set of one or more quality metrics at the location measured by the UE for wireless signals from the one or more base stations in the second wireless network.

One implementation (28) may be a server configured for wireless communications with a user equipment (UE) performed by a server, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the server comprising: an external interface configured to wirelessly communicate with UEs in a wireless communication system; at least one memory; at least one processor coupled to the external interface and the at least one memory, wherein the at least one processor is configured to: receive, via the external interface, signal information from the UE and attached location information for a location of the UE, the signal information comprising one or more of an expected data throughput for at least the first wireless network determined by the UE at the location for wireless signals from one or more base stations in the first wireless network, an assignment of higher priority for connection to the second wireless network than the first wireless network by the UE at least partially due to the expected data throughput for at least the first wireless network, or a combination thereof; store the received signal information and attached location information for the location; and transmit, via the external interface, at least the received signal information to a second UE when the second UE is at the location.

There may be some implementations (29) of the above-described server (28) wherein the expected data throughput is based on whether a carrier aggregation mode is possible for at least the first wireless network at the location determined by the UE based on the wireless signals from the one or more base stations.

There may be some implementations (30) of the above-described server (29) wherein the expected data throughput is further based on a number of carriers available to be aggregated in the second wireless network determined by the UE based on searching availability of frequencies on supported carrier aggregation band combinations in the second wireless network.

There may be some implementations (31) of the above-described server (29) wherein the expected data throughput is further based on a number of multiple input, multiple output (MIMO) layers to communicate with a serving base station determined by the UE based on rank determined using a reference signal from the serving base station.

There may be some implementations (32) of the above-described server (28) wherein the expected data throughput is based on a maximum bandwidth supported by the one or more base stations at the location determined by the UE based on base station capability and band of operation for the wireless signals from the one or more base stations.

There may be some implementations (33) of the above-described server (28) wherein the expected data throughput is further based on whether E-UTRAN NR—Dual Connectivity (ENDC) is available at the location determined by the UE.

There may be some implementations (34) of the above-described server (28) the signal information further comprises values of one or more quality metrics measured by the UE at the location for the wireless signals from the one or more base stations in the first wireless network.

There may be some implementations (35) of the above-described server (34) wherein the wireless signals from the one or more base stations in the first wireless network comprise at least one of Synchronization Signals (SS) and Channel State Information (CSI) and the values of the one or more quality metrics measured by the UE comprise one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ.

There may be some implementations (36) of the above-described server (34) wherein the signal information further comprises values of a second set of one or more quality metrics at the location measured by the UE for wireless signals from the one or more base stations in the second wireless network.

One implementation (37) may be a method for wireless communication of a user equipment (UE) performed by the UE, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), the method comprising: monitoring an upper layer indication information element (IE) from a first base station from the first wireless network while in idle mode and the upper layer indication information element (IE) from a second base station from the second wireless network while in idle mode; determining which of the first wireless network and the second wireless network supports ENDC mode from the upper layer indication IE from the first base station from the first wireless network and the upper layer indication information element (IE) from the second base station from the second wireless network; and dynamically selecting the first carrier subscription or the second carrier subscription for DDS based which wireless network supports the ENDC mode.

One implementation (38) may be a user equipment (UE) configured for wireless communications, wherein the UE has multiple carrier subscriptions, wherein a first wireless network comprising a first Evolved Universal Mobile Telecommunications System (UMTS) Terrestrial Radio Access Network (E-UTRAN) is associated with a first carrier subscription and a second wireless network comprising a second E-UTRAN is associated with a second carrier subscription, the UE supports E-UTRAN New Radio (NR)—Dual connectivity (ENDC), and supports Default Data Subscription (DDS), the UE comprising: a wireless transceiver configured to wirelessly communicate with network entities in a wireless communication system; at least one memory; at least one processor coupled to the wireless transceiver and the at least one memory, wherein the at least one processor is configured to: monitor an upper layer indication information element (IE) received from a first base station from the first wireless network while in idle mode, received via the wireless transceiver, and the upper layer indication information element (IE) from a second base station from the second wireless network while in idle mode, received via the wireless transceiver; determine which of the first wireless network and the second wireless network supports ENDC mode from the upper layer indication IE from the first base station from the first wireless network and the upper layer indication information element (IE) from the second base station from the second wireless network; and dynamically select the first carrier subscription or the second carrier subscription for DDS based which wireless network supports the ENDC mode.

Therefore, it is intended that claimed subject matter not be limited to the particular examples disclosed, but that such claimed subject matter may also include all aspects falling within the scope of appended claims, and equivalents thereof.

What is claimed is:

1. A method for wireless communication of a user equipment (UE) performed by the UE, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the method comprising:
   receiving wireless signals from one or more base stations in the first wireless network;
   estimating an expected data throughput for at least the first wireless network based on the received wireless signals;
   assigning the higher priority for connection to the second wireless network than the first wireless network at least partially due to the estimated expected data throughput for at least the first wireless network;
   attaching location information for a current location of the UE to signal information comprising at least one of the estimated expected data throughput for at least the first wireless network, the assignment of the higher priority for connection to the second wireless network than the first wireless network, or a combination thereof; and
   uploading the signal information and attached location information to a server.

2. The method of claim 1, wherein estimating the expected data throughput for at least the first wireless network comprises determining whether a carrier aggregation mode is possible for at least the first wireless network based on the received wireless signals from the one or more base stations, wherein assigning the higher priority for connection to the second wireless network than the first wireless network is at least partially due to whether the carrier aggregation mode is possible.

3. The method of claim 2, wherein estimating the expected data throughput for at least the first wireless network further comprises determining a number of carriers available to be aggregated in the second wireless network by searching availability of frequencies on supported carrier aggregation band combinations in the second wireless network.

4. The method of claim 2, wherein estimating the expected data throughput for at least the first wireless network further comprises determining a number of multiple input, multiple output (MIMO) layers to communicate with a serving base station by determining rank using a reference signal from the serving base station.

5. The method of claim 1, wherein estimating the expected data throughput from the first wireless network and the second wireless network comprises determining a maximum bandwidth supported by the one or more base stations in the first wireless network based on base station capability and band of operation for the wireless signals from the one or more base stations, wherein assigning the higher priority for connection to the second wireless network than the first wireless network is at least partially due to the maximum bandwidth supported by the one or more base stations.

6. The method of claim 1, wherein the UE supports E-UTRAN NR Dual Connectivity (ENDC), wherein estimating the expected data throughput for at least the first wireless network comprises determining whether ENDC is available at a current location of the UE, wherein assigning the higher priority for connection to the second wireless network than the first wireless network is at least partially due to availability of ENDC at the current location of the UE.

7. The method of claim 1, wherein the UE has multiple carrier subscriptions, wherein the first wireless network is associated with a first carrier subscription and the second wireless network is associated with a second carrier subscription, and the UE supports Default Data Subscription (DDS), the method further comprising:
dynamically selecting the first carrier subscription or the second carrier subscription for DDS, wherein the second carrier subscription is selected for DDS at least partially due to estimated expected data throughput for at least the first wireless network.

8. The method of claim 1, further comprising:
monitoring one or more quality metrics of the received wireless signals from the first wireless network; and
comparing values of the one or more quality metrics to associated predetermined thresholds;
wherein assigning the higher priority for connection to the second wireless network than the first wireless network is further at least partially due to the values of the one or more quality metrics being less than the associated predetermined thresholds.

9. The method of claim 8, wherein the UE receives the wireless signals from the first wireless network and monitors the one or more quality metrics of the received wireless signals while in idle mode.

10. The method of claim 8, wherein the received wireless signals are Synchronization Signals (SS) and monitoring the one or more quality metrics of the received wireless signals comprises monitoring values of one or more of SS Reference Signal Received Power (SS-RSRP), SS Received Signal Strength Indicator (SS-RSSI), SS Reference Signal Received Quality (SS-RSRQ).

11. The method of claim 8, wherein monitoring the one or more quality metrics of the received wireless signals comprises caching the values of the one or more quality metrics of the received wireless signals until the UE is in connected mode and comparing the values of the one or more quality metrics to the associated predetermined thresholds is performed while the UE is in the connected mode.

12. The method of claim 8, wherein the UE receives the wireless signals from the first wireless network and monitors the one or more quality metrics of the received wireless signals while in connected mode.

13. The method of claim 8, wherein the received wireless signals include at least one of Synchronization Signals (SS) and Channel State Information (CSI) and monitoring the one or more quality metrics of the received wireless signals comprises monitoring values of one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ.

14. A user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the UE comprising:
a wireless transceiver configured to wirelessly communicate with network entities in a wireless communication system;
at least one memory;
at least one processor coupled to the wireless transceiver and the at least one memory, wherein the at least one processor is configured to:
receive wireless signals, via the wireless transceiver, from one or more base stations in the first wireless network;
estimate an expected data throughput for at least the first wireless network;
assign the higher priority for connection to the second wireless network than the first wireless network at least partially due to the estimated expected data throughput for at least the first wireless network;
attach location information for a current location of the UE to signal information comprising at least one of the estimated expected data throughput for at least the first wireless network, the assignment of the higher priority for connection to the second wireless network than the first wireless network, or a combination thereof; and
upload, via the wireless transceiver, the signal information and attached location information to a server.

15. The UE of claim 14, wherein the at least one processor is configured to estimate the expected data throughput for at least the first wireless network by being configured to determine whether a carrier aggregation mode is possible for at least the first wireless network based on the received wireless signals from the one or more base stations, wherein the at least one processor is configured to assign the higher priority for connection to the second wireless network than the first wireless network at least partially due to whether the carrier aggregation mode is possible.

16. The UE of claim 15, wherein the at least one processor is further configured to estimate the expected data throughput for at least the first wireless network by being configured to determine a number of carriers available to be aggregated in the second wireless network by searching availability of frequencies on supported carrier aggregation band combinations in the second wireless network.

17. The UE of claim 15, wherein the at least one processor is further configured to estimate the expected data throughput for at least the first wireless network by being configured to determine a number of multiple input, multiple output (MIMO) layers to communicate with a serving base station by determining rank using a reference signal from the serving base station.

18. The UE of claim 14, wherein the at least one processor is configured to estimate the expected data throughput from the first wireless network and the second wireless network by being configured to determine a maximum bandwidth supported by the one or more base stations in the first wireless network based on base station capability and band of operation for the wireless signals from the one or more base stations, wherein the at least one processor is configured to assign the higher priority for connection to the second wireless network than the first wireless network at least partially due to the maximum bandwidth supported by the one or more base stations.

19. The UE of claim 14, wherein the UE supports E-UTRAN NR Dual Connectivity (ENDC), wherein the at least one processor is configured to estimate the expected data throughput for at least the first wireless network by being configured to determine whether ENDC is available at a current location of the UE, wherein the at least one processor is configured to assign the higher priority for connection to the second wireless network than the first wireless network at least partially due to availability of ENDC at the current location of the UE.

20. The UE of claim 14, wherein the UE has multiple carrier subscriptions, wherein the first wireless network is associated with a first carrier subscription and the second wireless network is associated with a second carrier subscription, and the UE supports Default Data Subscription (DDS), wherein the at least one processor is further configured to:
dynamically select the first carrier subscription or the second carrier subscription for DDS, wherein the second carrier subscription is selected for DDS at least partially due to estimated expected data throughput for at least the first wireless network.

21. The UE of claim 14, wherein the at least one processor is further configured to:
monitor one or more quality metrics of the received wireless signals from the first wireless network; and
compare values of the one or more quality metrics to associated predetermined thresholds;
wherein the at least one processor is further configured to assign the higher priority for connection to the second wireless network than the first wireless network at least partially due to the values of the one or more quality metrics being less than the associated predetermined thresholds.

22. The UE of claim 21, wherein the UE receives the wireless signals from the first wireless network, via the wireless transceiver, and monitors the one or more quality metrics of the received wireless signals while in idle mode.

23. The UE of claim 21, wherein the received wireless signals are Synchronization Signals (SS) and monitoring the one or more quality metrics of the received wireless signals comprises monitoring values of one or more of SS Reference Signal Received Power (SS-RSRP), SS Received Signal Strength Indicator (SS-RSSI), SS Reference Signal Received Quality (SS-RSRQ).

24. The UE of claim 21, wherein the at least one processor is configured to monitor the one or more quality metrics of the received wireless signals by being configured to cache the values of the one or more quality metrics of the received wireless signals until the UE is in connected mode and compare the values of the one or more quality metrics to the associated predetermined thresholds while the UE is in the connected mode.

25. The UE of claim 21, wherein the at least one processor is configured to receive the wireless signals from the first wireless network and monitor the one or more quality metrics of the received wireless signals while in connected mode.

26. The UE of claim 21, wherein the received wireless signals include at least one of Synchronization Signals (SS) and Channel State Information (CSI) and monitoring the one or more quality metrics of the received wireless signals comprises monitoring values of one or more of SS Reference Signal Received Power (SS-RSRP), SS Received Signal Strength Indicator (SS-RSSI), SS Reference Signal Received Quality (SS-RSRQ), CSI-RSRP, CSI-RSSI, CSI-RSRQ.

27. A user equipment (UE) configured for wireless communications, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the UE comprising:
means for receiving wireless signals from one or more base stations in the first wireless network;
means for estimating an expected data throughput for at least the first wireless network;
means for assigning the higher priority for connection to the second wireless network than the first wireless network at least partially due to the estimated expected data throughput for at least the first wireless network;
means for attaching location information for a current location of the UE to signal information comprising at least one of the estimated expected data throughput for at least the first wireless network, the assignment of the higher priority for connection to the second wireless network than the first wireless network, or a combination thereof; and
means for uploading the signal information and attached location information to a server.

28. A non-transitory storage medium including program code stored thereon, the program code is operable to cause at least one processor in a user equipment (UE) configured for wireless communication, wherein the UE supports a first wireless network comprising a Fifth Generation (5G) New Radio (NR) network and a second wireless network comprising an Evolved Universal Mobile Telecommunications System (UMTS) Terrestrial Radio Access Network (E-UTRAN), wherein by default the UE assigns a higher priority for connection to the first wireless network than the second wireless network, the non-transitory storage medium comprising:
program code to receive wireless signals from one or more base stations in the first wireless network;
program code to estimate an expected data throughput for at least the first wireless network;
program code to assign the higher priority for connection to the second wireless network than the first wireless network at least partially due to the estimated expected data throughput for at least the first wireless network;

program code to attach location information for a current location of the UE to signal information comprising at least one of the estimated expected data throughput for at least the first wireless network, the assignment of the higher priority for connection to the second wireless network than the first wireless network, or a combination thereof; and program code to upload, via the wireless transceiver, the signal information and attached location information to a server.

* * * * *